United States Patent
Arai et al.

(10) Patent No.: US 7,969,640 B2
(45) Date of Patent: Jun. 28, 2011

(54) COLOR DISPLAY SYSTEM

(75) Inventors: Kazuma Arai, Tokyo (JP); Taro Endo, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 318 days.

(21) Appl. No.: 12/315,794

(22) Filed: Dec. 5, 2008

(65) Prior Publication Data

US 2009/0128588 A1    May 21, 2009

Related U.S. Application Data

(60) Provisional application No. 61/005,599, filed on Dec. 6, 2007.

(51) Int. Cl.
  *G02B 26/00* (2006.01)
  *G02B 26/08* (2006.01)
  *G02F 1/29* (2006.01)
(52) U.S. Cl. .................................. 359/290; 359/298
(58) Field of Classification Search .......... 359/290–292, 359/295, 298; 382/276, 293, 298–300
See application file for complete search history.

(56) References Cited

U.S. PATENT DOCUMENTS

| | | | |
|---|---|---|---|
| 4,662,746 A | 5/1987 | Hornbeck | |
| 5,214,420 A | 5/1993 | Thompson et al. | |
| 5,285,407 A | 2/1994 | Gale et al. | |
| 5,287,096 A | 2/1994 | Thompson et al. | |
| 5,452,024 A | 9/1995 | Sampsell | |
| 5,589,852 A | 12/1996 | Thompson et al. | |
| 5,617,243 A | 4/1997 | Yamazaki et al. | |
| 5,668,611 A | 9/1997 | Ernstoff et al. | |
| 5,751,379 A | 5/1998 | Markandey et al. | |
| 5,767,828 A | 6/1998 | McKnight | |
| 5,844,588 A * | 12/1998 | Anderson | 347/135 |
| 5,903,323 A | 5/1999 | Ernstoff et al. | |
| 6,256,425 B1 | 7/2001 | Kunzman | |
| 6,897,884 B2 | 5/2005 | Tsuge et al. | |
| 6,987,597 B2 | 1/2006 | Hewlett | |
| 2005/0259121 A1 | 11/2005 | Miyagawa | |
| 2006/0181653 A1 | 8/2006 | Morgan | |
| 2007/0040998 A1 | 2/2007 | Yamazaki | |
| 2007/0120786 A1 | 5/2007 | Bellls et al. | |
| 2008/0068359 A1 | 3/2008 | Yoshida et al. | |

* cited by examiner

*Primary Examiner* — Scott J Sugarman
*Assistant Examiner* — Brandi N Thomas
(74) *Attorney, Agent, or Firm* — Bo-In Lin

(57) ABSTRACT

An image display apparatus is disclosed in this invention. The image display apparatus includes a light source for emitting an illumination light, at least one spatial light modulator for receiving and applying an image signal for modulating illumination light from the light source, and a control circuit for controlling the light source and/or the spatial light modulator to project a modulated light for image display having different gray scale characteristics between at least two successive frames.

11 Claims, 17 Drawing Sheets

COLOR DISPLAY SYSTEM

CROSS REFERENCE TO RELATED APPLICATION

This application claims the benefit of priority to U.S. provisional patent application Ser. No. 61/005,599 filed on Dec. 6, 2007, a Non-provisional patent application Ser. No. 11/121,543 filed on May 3, 2005 issued into U.S. Pat. No. 7,268,932 and another Non-provisional application Ser. No. 10/698,620 filed on Nov. 1, 2003. The application Ser. No. 11/121,543 is a Continuation In Part (CIP) Application of three previously filed Applications. These three Applications are 10/698,620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates to an image display system. More particularly, the present invention relates to an image display apparatus with one or more spatial light modulators and an adjustable light source control by a control circuit to achieve higher quality of display images.

2. Description of the Related Art

Even though there have been significant advances made in recent years in the technology of implementing electromechanical micromirror devices as spatial light modulators (SLM), there are still limitations and difficulties when these are employed to display high quality images. Specifically, when the display images are digitally controlled, the quality of the images is adversely affected because the images are not displayed with a sufficient number of gray scale gradations.

Electromechanical mirror devices are drawing a considerable amount of interest as spatial light modulators (SLM). The electromechanical mirror device is commonly implemented with a mirror array that includes a large number of mirror elements. In general, the number of mirror elements may range from 60,000 to several millions and are formed on the surface of a substrate controlled by electric circuits also formed on the substrate to function as an electromechanical mirror device.

Refer to FIG. 1A for a digital video system 1 as disclosed in a relevant U.S. Pat. No. 5,214,420, which includes a display screen 2. A light source 10 is used to generate light energy to illuminate display screen 2. Light 9 is further concentrated and directed toward lens 12 by mirror 11. Lens 12, 13, and 14 serve a combined function as a beam collimator to direct light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes switchable reflective elements, e.g., micro-mirror devices 32 with elements 17, 27, 37, and 47 as reflective elements attached to a hinge 30, as shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

Most of the conventional image display devices, such as the devices disclosed in U.S. Pat. No. 5,214,420, are implemented with a dual-state mirror control that controls the mirrors to operate in either an ON or OFF state. The quality of an image display is limited due to the limited number of gray scale gradations. Specifically, in a conventional control circuit that applies a PWM (Pulse Width Modulation), the quality of the image is limited by the LSB (least significant bit) or the least pulse width, since the control is related to either the ON or OFF state. Since the mirror is controlled to operate in either an ON or OFF state, the conventional image display apparatuses have no way of providing a pulse width to control the mirror that is shorter than the LSB. The lowest intensity of light, which determines the smallest gradation to which brightness can be adjusted when adjusting the gray scale, is the light reflected during the period corresponding to the smallest pulse width. The limited gray scale gradation due to the LSB limitation leads to a degradation of the quality of the display image.

In FIG. 1C, a circuit diagram of a control circuit for a micro-mirror according to U.S. Pat. No. 5,285,407 is presented. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the Static Random Access switch Memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

FIG. 1D shows the "binary time periods" in the case of controlling the SLM by four-bit words. As shown in FIG. 1D, the time periods have relative values of 1, 2, 4, and 8 that in turn determine the relative intensity of light of each of the four bits, where "1" is the least significant bit (LSB) and "8" is the most significant bit. According to the PWM control mechanism, the minimum intensity of light that determines the resolution of the gray scale is a brightness controlled by using the "least significant bit" which holds the mirror at an ON position for the shortest controllable length of time.

For example, assuming n bits of gray scales, the frame time is divided into $2^n-1$ equal time periods. For a 16.7 millisecond frame period and n-bit intensity values, the time period is $16.7/(2^n-1)$ milliseconds When adjacent image pixels are shown with a great degree of difference in the gray scales, due to a very coarse scale of controllable gray scale, artifacts are shown between these adjacent image pixels. That leads to image degradations. The image degradations are especially pronounced in the bright areas of display, where there are "bigger gaps" between gray scales of adjacent image pixels. For example, it can be observed in an image of a female model that there are artifacts shown on the forehead, the sides of the nose and the upper arm. The artifacts are generated by technical limitations in that the digitally controlled display does not provide sufficient gray scales. Thus, in the bright areas of the display, the adjacent pixels are displayed with visible gaps of light intensities.

As the micromirrors are controlled to have a fully on and fully off position, the light intensity is determined by the length of time the micromirror is at the fully on position.

In a previously disclosed technique to display a color moving picture by means of one SLM, shown in the example of FIG. 2, each frame is divided into three subfields corresponding to the three primary colors of red, green, and blue and a color sequential control is performed. As shown in FIG. 2, the light intensity of the green laser light pulses in the green subfield $G_{f1}$ is held constant at $P_{G2}$ while a micromirror is controlled to an ON or OFF position by a PWM. Accordingly, the intensity of green light in the projected image visually perceived by an observer varies depending on the length of time in which a micromirror is at an ON position in one green subfield $G_{f1}$. The same can be said for the display blue and red light.

In order to increase the number of gray scale gradations of a display, the switching speed of the micromirror must be increased such that the digital control signals can be increased to a higher number of bits. However, when the switching speed of the micromirrors is increased, a stronger hinge is necessary for the micromirror to sustain the required number of operational cycles for a designated lifetime of operation. In order to drive the micromirrors supported on a further strengthened hinge, a higher voltage is required. In this case, the higher voltage may exceed twenty volts and may even be as high as thirty volts. A micromirror manufacturing process applying the CMOS (Complementary Metal Oxide Semiconductor) technologies would probably produce micromirrors that would not be suitable for operation at this higher range of voltages, and therefore, DMOS (Double diffused Metal Oxide Semiconductor) micromirror devices may be required in this situation. In order to achieve a higher degree of gray scale control, a more complicated manufacturing process and larger device areas are necessary when a DMOS micromirror is implemented. Conventional modes of micromirror control are therefore facing a technical challenge in that gray scale accuracy has to be sacrificed for the benefit of a smaller and more cost effective micromirror display, due to the operational voltage limitations.

There are many patents related to light intensity control. These patents include U.S. Pat. Nos. 5,589,852, 6,232,963, 6,592,227, 6,648,476, and 6,819,064. There are further patents and patent applications related to different shapes of light sources. These patents includes U.S. Pat. Nos. 5,442,414, 6,036,318, 5,617,243, 5,668,611, 5,767,828 and Published Applications 2003/0147052 and 2006/0181653. U.S. Pat. No. 6,746,123 discloses special polarized light sources, for preventing light loss. However, these patents and patent applications do not provide an effective solution to overcome the limitations caused by insufficient gray scale gradations in the digitally controlled image display systems.

Furthermore, there are many patents and patent applications related to spatial light modulation, including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,287,096, 5,506,597, 5,489,952, 5,751,397, 6,897,884, and Published Patent Applications 2005/0,259,121, 2007/0,120,786, and 2008/0,068,359.

SUMMARY OF THE INVENTION

An aspect of the present invention is to provide a new and improved image display apparatus to achieve a smoother gray scale expression with increased gray scale resolution in an image display using a spatial light modulator.

An image display apparatus according to an embodiment of the present invention includes a light source for emitting an illumination light, at least one spatial light modulator for receiving and applying an image signal for modulating the illumination light emitted from the light source; and a control circuit for controlling the light source and/or the spatial light modulator to project a modulated light for image display having different gray scale characteristics between at least two successive frames.

The resolution of brightness in a displayed image is controllable in accordance with the combination of gray scale characteristics of a number of colors. Thus, according to these configurations and processes for controlling image display apparatuses, a smoother gray scale expression and higher resolution for can be achieved.

BRIEF DESCRIPTION OF THE DRAWINGS

The present invention is described in detail below with reference to the following figures.

DESCRIPTION OF THE PREFERRED EMBODIMENTS

The embodiments of the present invention will now be described in detail with reference to the drawings.

Figure 3:
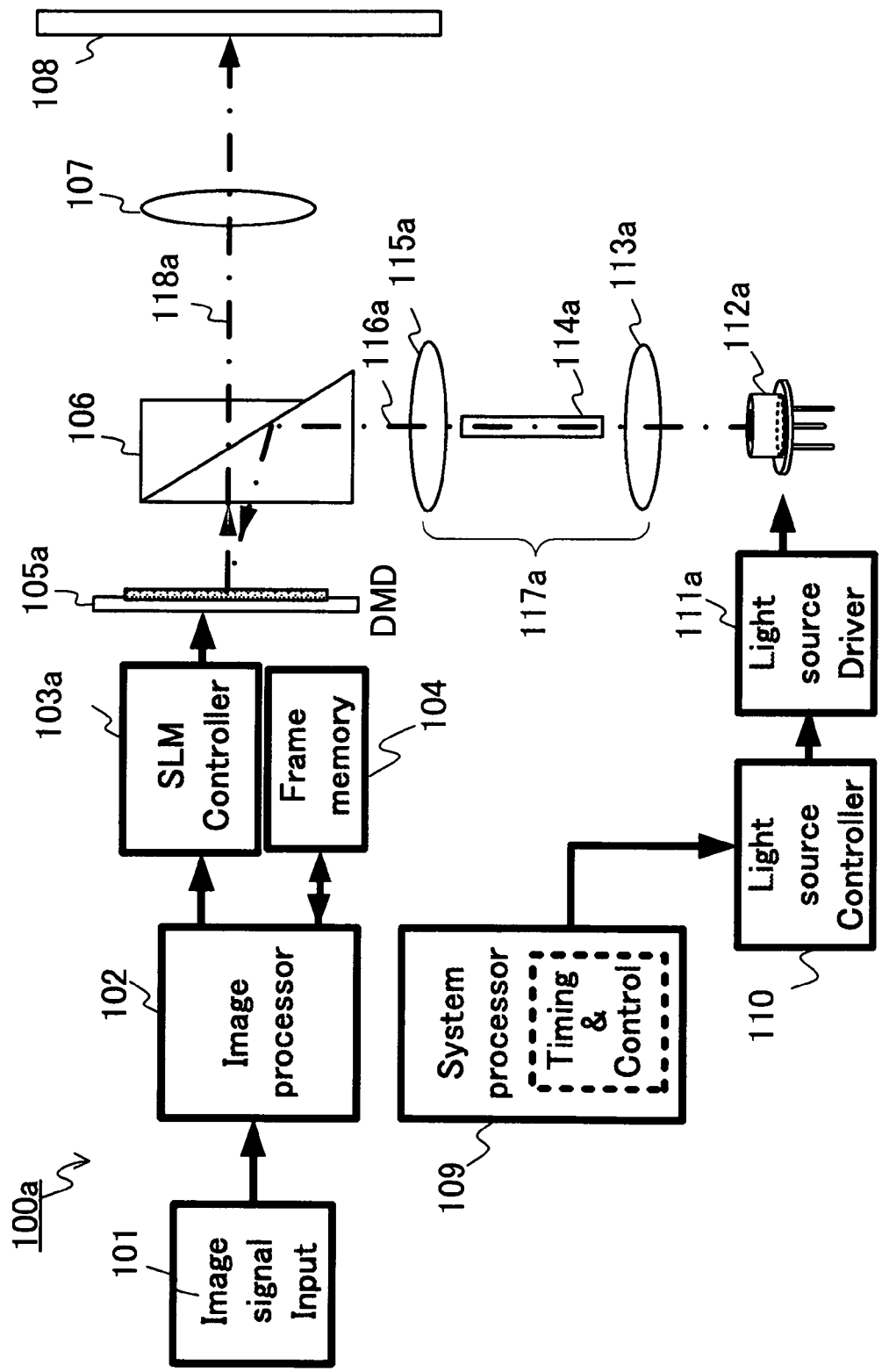
FIG. 3 is a functional block diagram showing the configuration of a single-panel projection system using an adjustable light source according to an embodiment of the present invention.

FIG. 3 is a functional block diagram for showing the configuration of a single-panel projection system using an adjustable light source according to an embodiment of the present invention.

According to the present embodiment, a single panel projection system 100a includes a single spatial light modulator (SLM) 105a for projecting an image onto a screen 108 in accordance with an externally inputted image signal input 101. Other than the screen 108, all the parts depicted in the figure may be integrated and packaged into an image display apparatus.

The projection system 100a in FIG. 3 includes an image processor 102. The image processor 102 receives an image signal input 101 from an external device and converts it into data for transmitting to an SLM controller 103a for controlling the SLM 105a. Specifically, the image processor 102 outputs the converted data for transmitting to the SLM controller 103a. A frame memory 104 is also connected to the image processor 102. In an exemplary embodiment, the frame memory 104 stores data of one frame of moving picture data.

The data for displaying the moving picture includes data represented by the image signal input 101. As described later, in some embodiments, the image processor 102 may generate/delete the data for displaying a frame of image based on the image signal input 101, and increase/decrease the frame rate. In such cases, the data generated is also a part of the data for displaying the moving picture, and the frame memory 104 has a capacity to store the data for displaying a frame of image.

An SLM 105a includes minute modulation elements configured as a two-dimensional array. Each modulation element corresponds to each pixel of an image to be displayed. There are several kinds of SLMs implemented with different types of modulation elements. For example, it is commonly known that the SLMs may be implemented with modulation elements such as transmissive liquid crystals, reflective liquid crystals, or micromirrors. In the descriptions below, the SLM 105a is described as a DMD (Digital Micromirror Device) implemented with array of micromirrors as the modulation element. The present invention may also be implemented with embodiments using other kinds of SLMs as well.

An adjustable light source 112a projects an illumination light to the SLM 105a though an illumination optical system 117a and a TIR (Total Internal Reflection) prism 106. The adjustable light source 112a is under control of a system processor 109 in an indirect manner, and thus the intensity of illumination light per unit of time may be controlled and flexibly adjusted. The adjustable light source 112a may be implemented as a part of an illumination unit (not shown), and the projection system 100a may include the illumination unit.

The illumination optical system 117a includes a condenser lens 113a, a rod type condenser body 114a, and a condenser lens 115a and the optical axes of the illumination optical system 117a are arranged to match the optical axis 116a of the illumination light of the illumination optical system 117a.

The adjustable light source 112a is controlled indirectly by the system processor 109. Specifically, the system processor 109 generates data and signals to provide information to a light source controller 110 for controlling the timing of emission and/or the intensity of light of the adjustable light source 112a (described later). The light source controller 110 controls a light source driver 111a on the basis of the information received from the system processor 109. The light source driver 111a drives the adjustable light source 112a on the basis of the control by the light source controller 110.

The adjustable light source 112a includes a red laser light source 136r, a green laser light source 136g, and a blue laser light source 136b, where the respective emission states of these laser light sources can be independently controlled. Details of this are described later with reference to FIG. 4. More specifically, these laser light sources are not shown in FIG. 3.

Light incident to the TIR prism 106 is an illumination light transmitted from the illumination optical system 117a along the illumination light axis 116a. This incident light is reflected within the TIR prism 106, and directed into the SLM 105a at a predetermined angle. Furthermore, the TIR prism 106 transmits the light reflected from the SLM 105a along a projection optical axis 118a to a projection lens 107 as part of a projection optical system. The projection lens 107 projects the reflected light transmitted from the TIR prism 106 onto a screen 108 as projection light.

In summary, the SLM 105a modulates the light emitted from the adjustable light source 112a in accordance with the image signal input 101, and the modulated light beam is projected by the projection optical system. Then, the adjustable light source 112a and the SLM 105a are directly or indirectly controlled by the image processor 102, SLM controller 103a, system processor 109, and light source controller 110.

Figure 4:
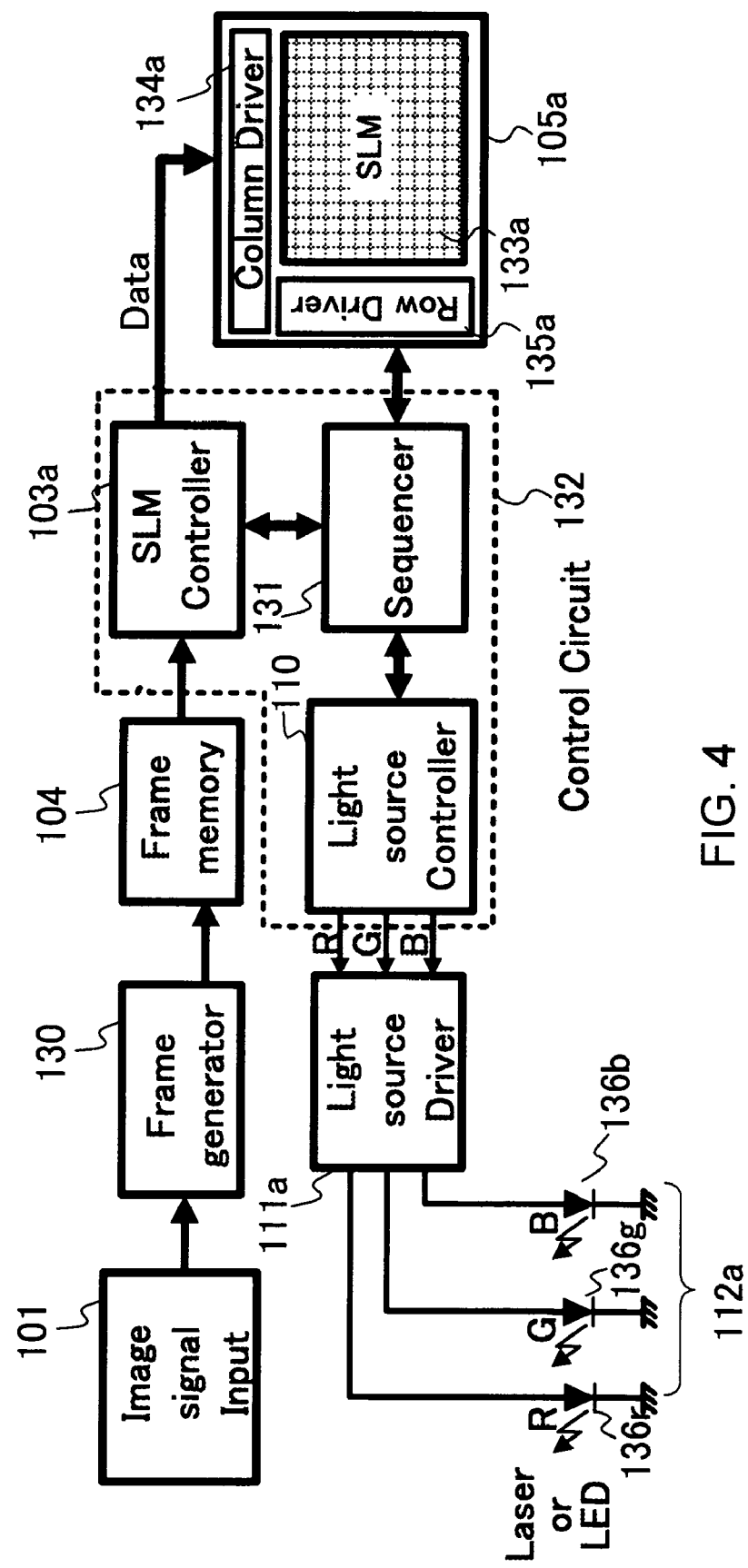
FIG. 4 is a functional block diagram showing the configuration of a single-panel projection system using an adjustable light source according to an embodiment of the present invention.

The following descriptions further illustrate the sequence of the control processes and the transmissions of the image data in the projection system 100a of FIG. 3, with reference to FIG. 4. 4. FIG. 4 is a functional block diagram showing the configuration of a single-panel projection system using an adjustable light source according to an embodiment of the present invention.

The image processor 102 of the present embodiment as shown in FIG. 3 includes a frame generator 130. FIG. 4 shows the image signal input 101 is inputted to the frame generator 130 from an external device. As described later with reference to FIG. 6, the frame generator 130 generates the data for displaying a frame of image using, for example, a well-known frame interpolation technique. When the frame rate of a moving picture represented by the image signal input 101 is at 60 fps (frames per second), for example, the frame generator 130 may make the frame rate go to 120 fps by generating frame images.

Both the data for displaying a frame of image originally included in the image signal input 101 and the data for displaying a frame of image generated at the frame generator 130 are stored in the frame memory 104. The SLM controller 103a and the light source controller 110 (shown in FIG. 3) may be implemented on a single control circuit 132, as shown in FIG. 4.

Furthermore, FIG. 4 shows a sequencer 131 that controls the SLM controller 103a and the light source controller 110 is also implemented on the control circuit 132. The sequencer 131 may be a part of the system processor 109 of FIG. 3.

The sequencer 131 controls the operational timings of the SLM controller 103a and the light source controller 110, respectively. The detailed timing control and required control accuracy are described later with reference to FIG. 9.

As described with respect to FIG. 3, the SLM controller 103a controls the SLM 105a. In the exemplary embodiments shown in FIGS. 3 and 4, the SLM 105a is a DMD, and the DMD is implemented with micromirror array 133a configured as micromirrors arranged with rows and columns connected to a column driver 134a, and a row driver 135a.

The SLM controller 103a transmits signals to the column driver 134a and the row driver 135a to drive the individual micromirrors in the micromirror array 133a. The micromirrors are driven to operate in one of several states, including at least an ON state and an OFF state. In some embodiments, a micromirror may be driven to operate in an intermediate oscillation state.

Specifically, the illumination light is projected into the SLM 105a with a predetermined angle along the illumination light axis 116a via the illumination optical system 117a and the TIR prism 106 of FIG. 3. The ON state refers to a state in when a micromirror is deflected to reflect the incident light along the projection optical axis 118a.

The OFF state refers to a state when the mirror is deflected to reflect the incident light away from the projection optical axis 118a of FIG. 3 therefore not entering into the projection lens 107. The incident light is projected into the SLM 105a with a predetermined angle along the illumination light axis 116a.

The intermediate oscillation state refers to a state when a micromirror oscillates, where the deflection angle of the micromirror oscillates between the deflection angle of the ON state and the deflection angle of the OFF state. An intensity of light between that of the ON state and that of the OFF state can be projected onto the screen 108 the intermediate oscillation state.

As illustrated in FIG. 3, the adjustable light source 112a includes a red laser light source 136r, a green laser light source 136g, and a blue laser light source 136b, where the laser light sources can be independently controlled to operate in different emission states. The LED (light emitting diode) light source may be used instead of those three laser light sources in alternate embodiments. The semiconductor light sources may be arranged as a sub-array. Specifically, a light source may include a number of sub-light sources and each sub-light source may be implemented with the above-mentioned laser light source or the LED light source and arranged in an array. All these different light sources may be used in place of the adjustable light source 112a of FIG. 3.

As shown in FIG. 4, the light source controller 110 transmits independently each control data, as that described below, to a light source driver 111a to drive the red laser light source 136r, the green laser light source 136g, and the blue laser light source 136b. The three arrows from the light source controller 110 to the light source driver 111a in FIG. 4 correspond to respective control data for driving the red laser light source 136r, the green laser light source 136g, and the blue laser light source 136b. The red, green and blue colors are shown in FIG. 4 as "R", "G", and "B" respectively.

Figure 5:
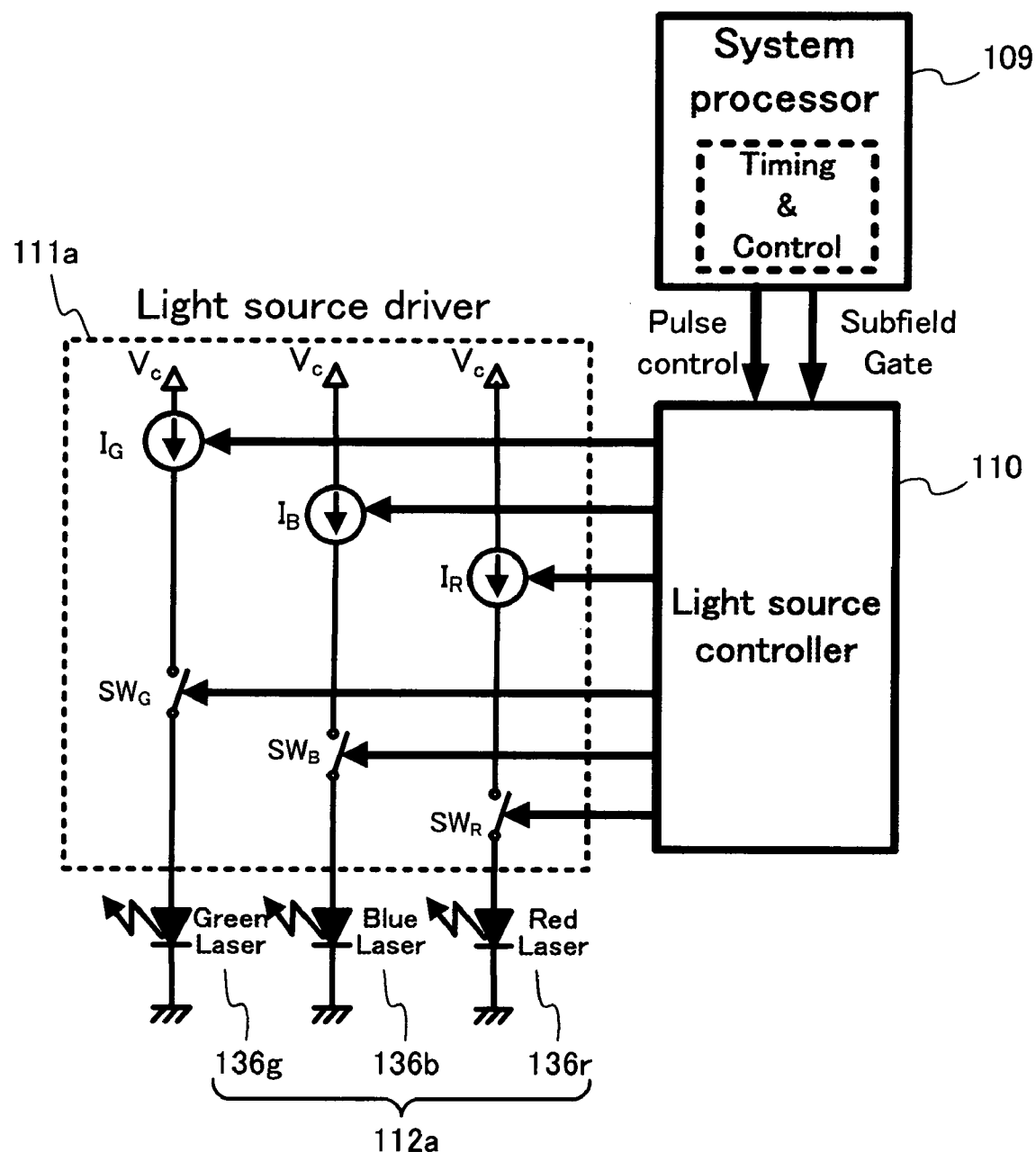
FIG. 5 is a functional block diagram showing the configuration of a light source driver in a projection system using an adjustable light source according to an embodiment of the present invention.

FIG. 5 further illustrates the light source driver 111a shown in FIG. 3 and FIG. 4. FIG. 5 is a functional block diagram for showing the configuration of a light source driver in a projection system using an adjustable light source according to an embodiment of the present invention.

The light source driver 111a includes three constant current circuits, i.e., $I_R$, $I_G$, and $I_B$, and three corresponding switching circuits, i.e., $SW_R$, $SW_G$, and $SW_B$, in order to project designated light intensity in the red laser light source 136r, the green laser light source 136g, and the blue laser light source 136b respectively implemented as part of the adjustable light source 112a. The constant current circuits $I_R$, $I_G$, and $I_B$ are variable constant current circuits. Specifically, the light source driver 111a has a high-speed operation to drive the current by including a constant current circuit that supplies a threshold current to laser light sources (not shown).

The switching circuit $SW_R$ switches the ON/OFF connection between the constant current circuit $I_R$ and the red laser light source 136r. The switching circuit $SW_G$ switches the ON/OFF connection between the constant current circuit $I_G$ and the green laser light source 136g. The switching circuit $SW_B$ switches the ON/OFF connection between the constant current circuit $I_B$ and the blue laser light source 136b.

The system processor 109 outputs a control signal to control the projection of a representative light profile that designates the timing and the intensity of light to the light source controller 110. The light source controller 110 controls the constant current circuits $I_R$, $I_G$, and $I_B$ and the switching circuits $SW_R$, $SW_G$, and $SW_B$ on the basis of the control signal input from the system processor 109.

Also, the system processor 109 outputs a control signal that corresponds to the start timing of each subfield to the light source controller 110, This control signal is shown as "Subfield Gate" in FIG. 5.

FIGS. 3 to 5 illustrate below several control methods of a color sequential control in a single-panel projection system having the above-mentioned configurations. The description below further explains the exemplary process of dividing each of the frames into three subfields corresponding to the three primary colors of red (R), green (G), and blue (B), and performing a color sequential control. In the exemplary control methods described in FIGS. 7 through 12, the intensity of illumination light from the adjustable light source 112a per unit time is controlled by units of a frame or a subfield of each color.

Furthermore, the light source controller 110 may also control the light source by changing the circuit setting of the constant current circuits $I_R$, $I_G$, and $I_B$, based on an instruction signal of the sequencer 132 in response to the image signal input 101.

Figure 6:
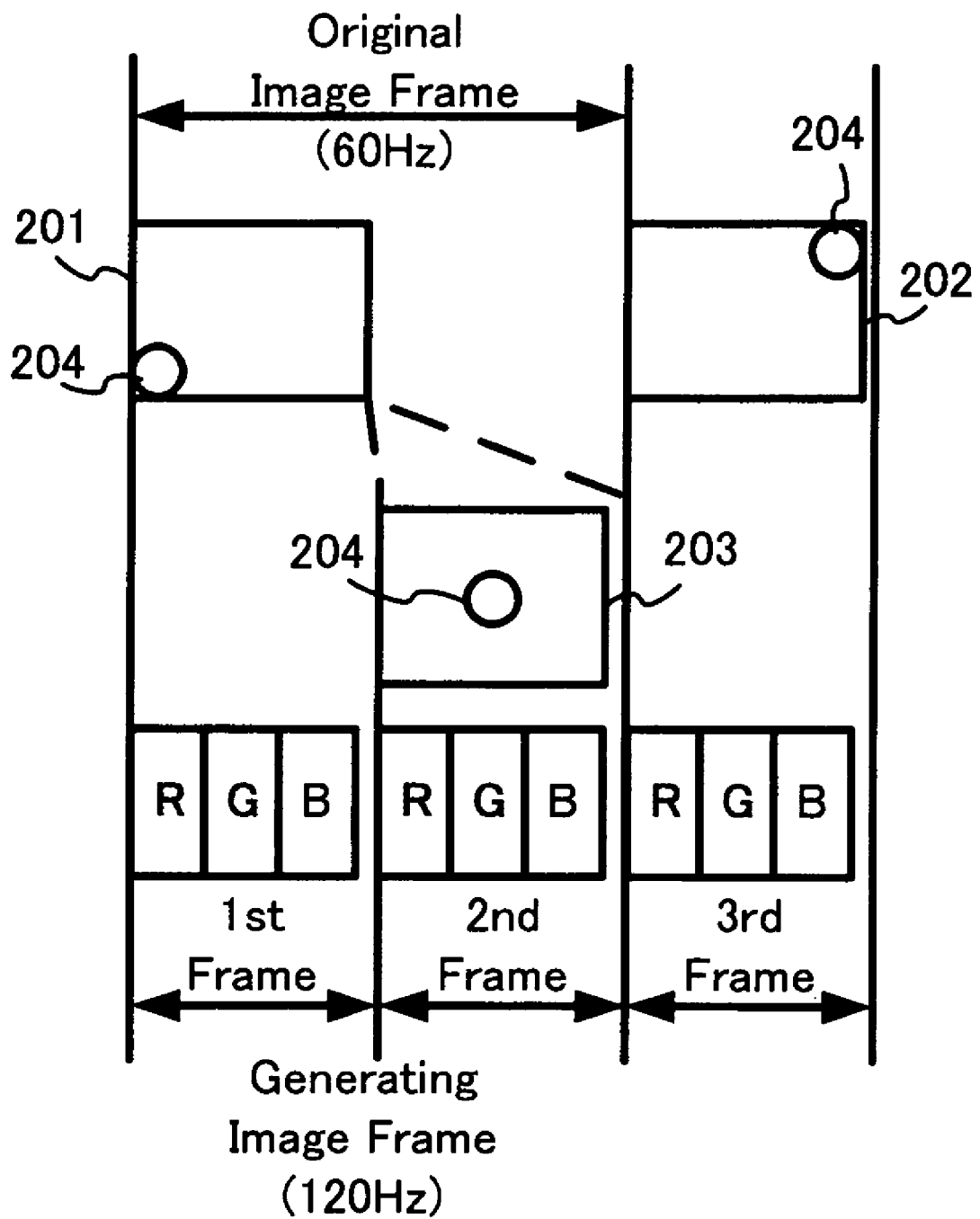
FIG. 6 is a functional block diagram describing the generation of a frame image.

FIG. 6 illustrates an exemplary embodiment for controlling the intensity of the illumination light emitted during a display frame. More specifically, FIG. 6 is a functional block diagram for showing the division of a display frame into sub-frames for generation an image in each display frame.

For example, when the frame frequency of the image signal input is at 60 Hz, the image for display in a display frame is usually displayed during a period of 1/60 second. However, in recent years, a technique of generating and displaying images in a frame by using new techniques such as the interpolation of a moving picture have been utilized, for example, in liquid crystal display television screens.

Once a new image is generated for displaying in a frame by using the techniques of moving picture interpolation, two or more frames of images are sequentially displayed within a period of 1/60 second, which is the period for one frame in an image signal input. Accordingly, a higher switching speed or gray scale change can be displayed more smoothly.

FIG. 6 shows an example of an image signal input represents a moving picture at a 60 Hz frame rate. At the bottom left side of a first frame image 201 represented by the image signal input, an object 204 is shown. Also, at the top right side of a second frame image 202 represented by the image signal input, the same object 204 is shown.

Several methods of interpolating a moving picture are known. A method includes an interpolation of the motion vector of the object 204. Further methods may include an interpolation of the data of at least one of the immediate before and immediate after frame images 201 and 202. The number of frames included in the interpolation of frame images generated between the frame images 201 and 202 is flexibly adjustable depending on the specific requirements of the display systems. FIG. 6, only one frame image is generated between the frame images 201 and 202.

The frame generator 130 of FIG. 4 generates the interpolation frame image 203 between the first sheet of frame image 201 and the second sheet of frame image 202 by a selected interpolating method according to the input image signal input 101. According to the time divisions shown in FIG. 6, an object 204 is shown at about the center of the generated interpolation frame image 203. Accordingly, by using the interpolation frame image 203, the movement of the object 204 is displayed more smoothly.

The frame memory 104 of FIGS. 3 and 4 has a capacity to store not only the data of the frame images 201 and 202 represented by the image signal input 101 but also the data of the generated interpolation frame image 203. Therefore, at the time of adjusting and increasing the frame rate to accommodate the generation of the interpolation frame image 203, the data of frame images stored in the frame memory 104 are sequentially transferred to the SLM controller 103a and the images for displaying in each frame transferred to the SLM are sequentially displayed onto the screen 108 of FIG. 3.

FIG. 6 therefore shows that the originally existing frame images 201 and 202 represented by the image signal input 101, as well as the generated interpolation frame image 203, are displayed in a period of 1/120 second. Accordingly, the frame rate becomes 120 Hz, which is twice the frame rate of the image signal input 101.

As shown in FIG. 6, the frame images are sequentially displayed in an order starting with the frame image 201 represented by the image signal input 101, then the generated interpolation frame image 203, and then the frame image 202 represented by the image signal input 101. The subsequent frames that follow are displayed in a similar way.

When the color sequential display of the three colors of red (R), green (G), and blue (B) is performed, the frames of 120 Hz are divided into three subfields corresponding to red, green, and blue, as shown in FIG. 6.

For the sake of simplicity, it is assumed below that the image signal input 101 is a signal representing a frame image in accordance with the RGB color space and that the data in the RGB format is stored in the frame memory 104. In practice, the embodiment below may be modified and implemented depending on the format of the image signal input 101.

For example, the image signal input 101 may be in a format comprised of a luminance signal and a chrominance signal known as YUV. In this case, the processor 102 may use the well-known methods to convert the format of the image signal input 101 to the RGB format and then stores the converted data of the frame image in the frame memory 104.

In the embodiments shown in FIGS. 7 through 12, the intensity of illumination light from the adjustable light source 112a is changed in a display frame. Specifically, the light source controller 110 of FIGS. 3 and 4 controls the intensity of the illumination light when displaying the frame image 203 generated from interpolation to have different intensity of illumination light than the intensity for displaying the frame images 201 or 202 that correspond to the image signal input 101.

The adjustable light source 112a is further controlled as shown in FIGS. 7 through 10, with each frame period is equal. However, alternately, each frame period may also be adjustable in different embodiments.

Figure 7:
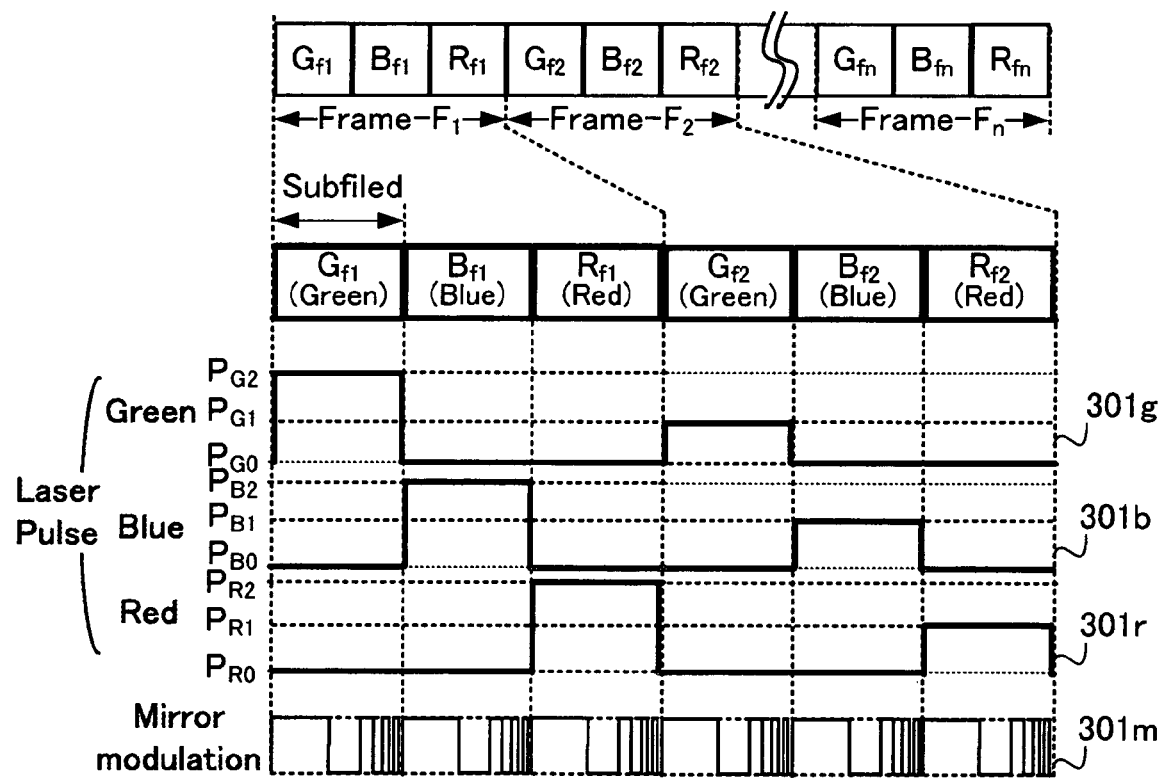
FIG. 7 is a timing chart of a color sequential control in a single-panel projection system using an adjustable light source according to an embodiment of the present invention.

FIG. 7 is a timing diagram of a color sequential display in a single-panel projection system using an adjustable light source according to an embodiment of the present invention. In an example of FIG. 7, the amount of illumination light emitted from the adjustable light source 112a per unit of time is changed by changing the light intensity of the emitted light.

In FIG. 7, the display period for each frame $F_j$ (=1, 2 ... n) is divided into green subfield $G_{fj}$, blue subfield $B_{fj}$, and red subfield $R_{fj}$.

The order of subfields may be in the order RGB as in FIG. 6, in the order GBR as in FIG. 7, or in another arbitrary order.

In the example of FIG. 7, the intensity of illumination light of the green laser light source 136g can be set to at least three levels: $P_{G0}$, $P_{G1}$, and $P_{G2}$. The intensity of illumination light of the blue laser light source 136b can be at least set to at least three levels: $P_{B0}$, $P_{B1}$, and $P_{B2}$. The intensity of illumination light of the red laser light source 136r can be set to at least three levels: $P_{R0}$, $P_{R1}$, and $P_{R2}$.

The following relationships are shown in FIG. 7.

$$P_{G0} < P_{G1} < P_{G2}$$

$$P_{B0} < P_{B1} < P_{B2}$$

$$P_{R0} < P_{R1} < P_{R2}$$

where $P_{G0} = P_{B0} = P_{R0} = 0$. Also, $P_{G2}$, $P_{B2}$, and $P_{R2}$ represent the intensity of illumination light required for displaying an image on the screen 108 with a necessary brightness. The necessary brightness may be determined, for example, on the basis of the gray scale characteristics required by the specification of the projection system 100a. The specific values of $P_{G2}$, $P_{B2}$, and $P_{R2}$ are also determined based on the luminosity factor and/or the emission characteristics of laser light sources, and hence those values are not necessarily the same. Similarly, the values of $P_{G1}$, $P_{B1}$, and $P_{R1}$ are not necessarily the same.

Hereinafter, the variation patterns of the intensity of illumination light from the green laser light source 136g, the blue laser light source 136b, and the red laser light source 136r are referred to as light profile 301g, 301b, and 301r respectively. Specifically, the data of the light profile 301g for the green laser light source 136g includes at least the data of the control pattern in the green subfield, but may not include the data of the control pattern in the blue and red subfields. Because when the data do not explicitly designate the green light, the green light is not emitted at the blue and red subfields in the color sequential display of the single-panel projection system 100a. Also, in the blue light profile 301b and the red light profile 301r, the data of control patterns in the subfields of different colors may be omitted in the same way.

The color sequential display in a first frame $F_1$ is performed as follows.

First, the light intensity of the green laser light source 136g is set to $P_{G2}$ in a green subfield $G_{f1}$. At the same time, the light intensity of the blue laser light source 136b and the red laser light source 136r may be set to $P_{B0}$ and $P_{R0}$, respectively.

The light intensity of the laser light sources is set by the light source controller 110 controlling the light source driver 111a in accordance with instruction from the sequencer 131 of FIG. 4 at the start of each subfield or within a subfield period of a different color. Also, the laser light sources are controlled to emit pulses by controlling switching circuits $SW_G$, $SW_B$, and $SW_R$ arranged underneath the constant current circuits $I_R$, $I_G$, and $I_B$ of FIG. 5 on the basis of the light profile.

In the green subfield $G_{f1}$, the light intensity of the blue laser light source 136b and the red laser light source 136r do not necessarily have to be set. As long as the light source controller 110 of FIG. 5 sets the switching circuits $SW_B$ and $SW_R$ to OFF, the intensity of illumination light from the blue laser light source 136b and the red laser light source 136r respectively becomes $P_{B0}$ (=0) and $P_{R0}$ (=0) regardless of the setting of constant current circuits $I_B$, and $I_R$.

Figure 1A:
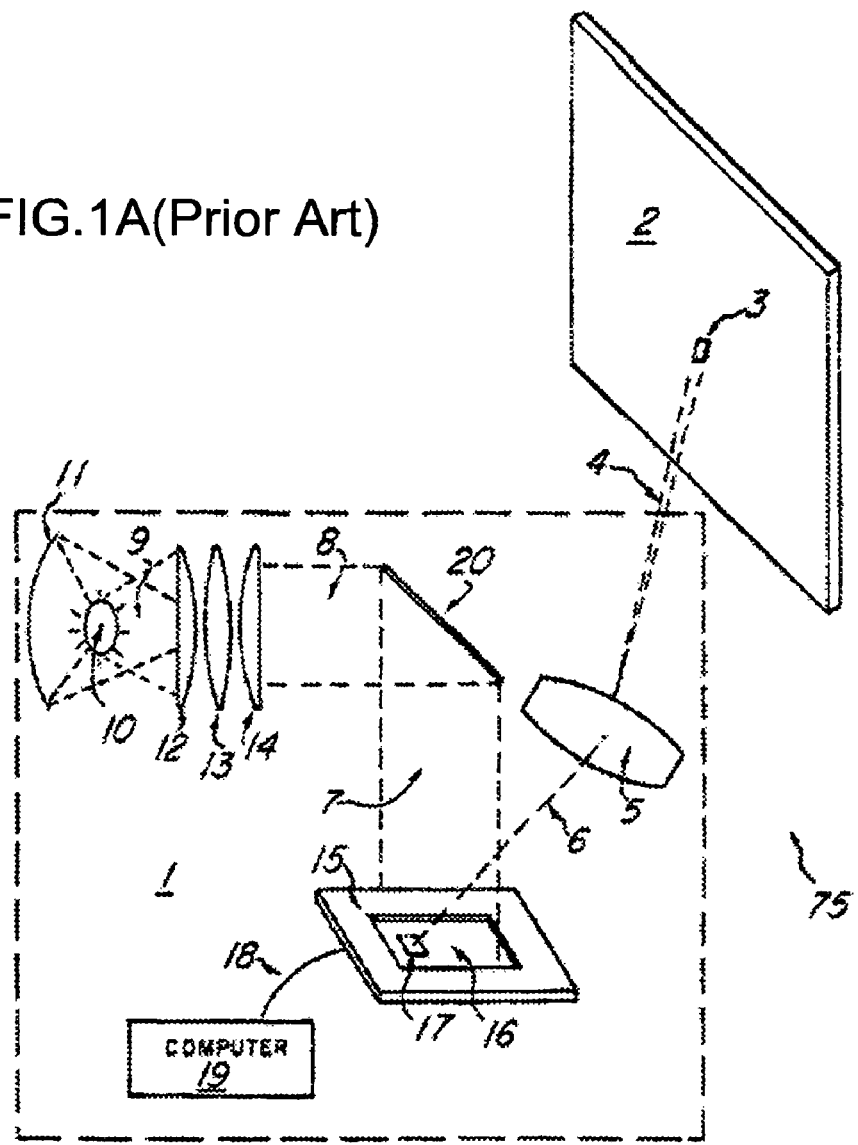
FIG. 1A is a functional block diagram showing the configuration of a conventional projection apparatus.
Figure 1B:
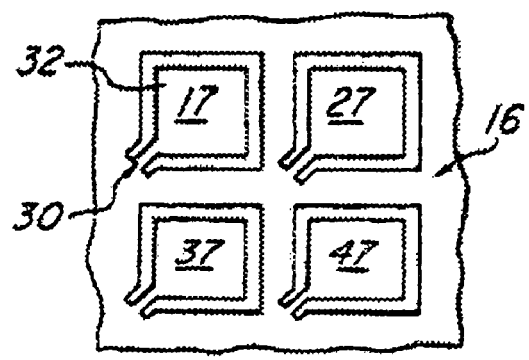
FIG. 1B is a top view diagram showing the configuration of mirror elements of a portion of a micromirror array of a conventional projection apparatus.
Figure 1C:
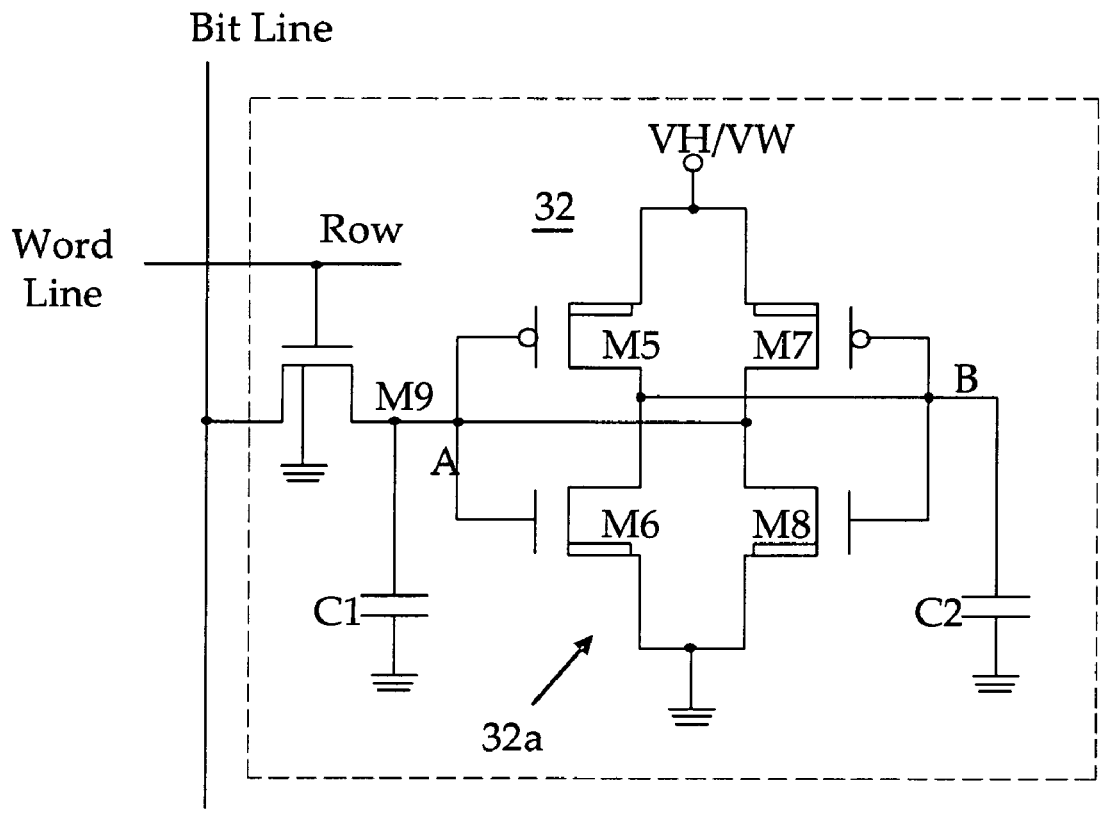
FIG. 1C is a circuit diagram showing the configuration of a drive circuit of mirror elements of a conventional projection apparatus.
Figure 1D:
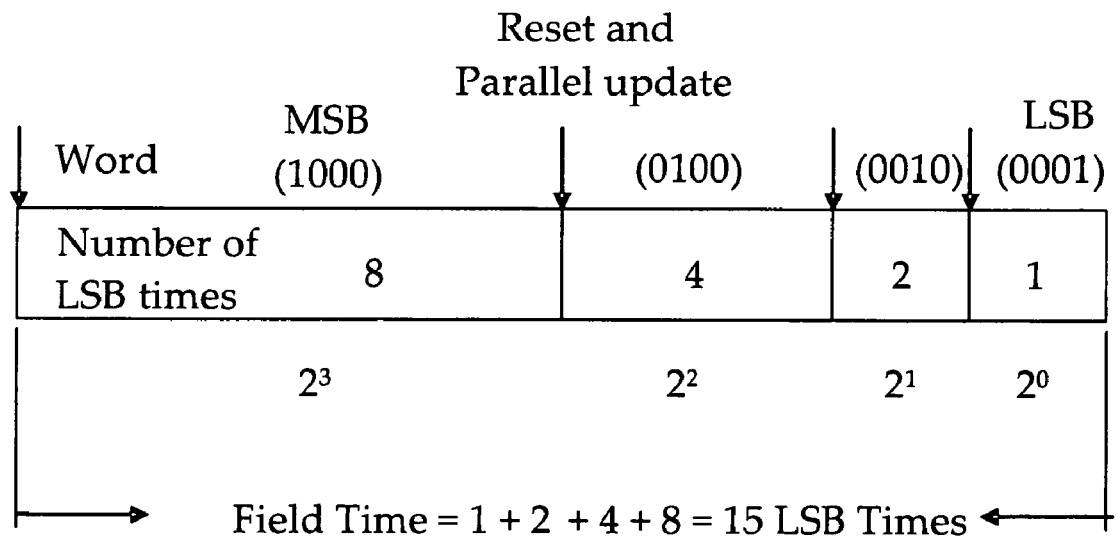
FIG. 1D is a diagram showing a format of image data in a conventional projection apparatus
Figure 2:
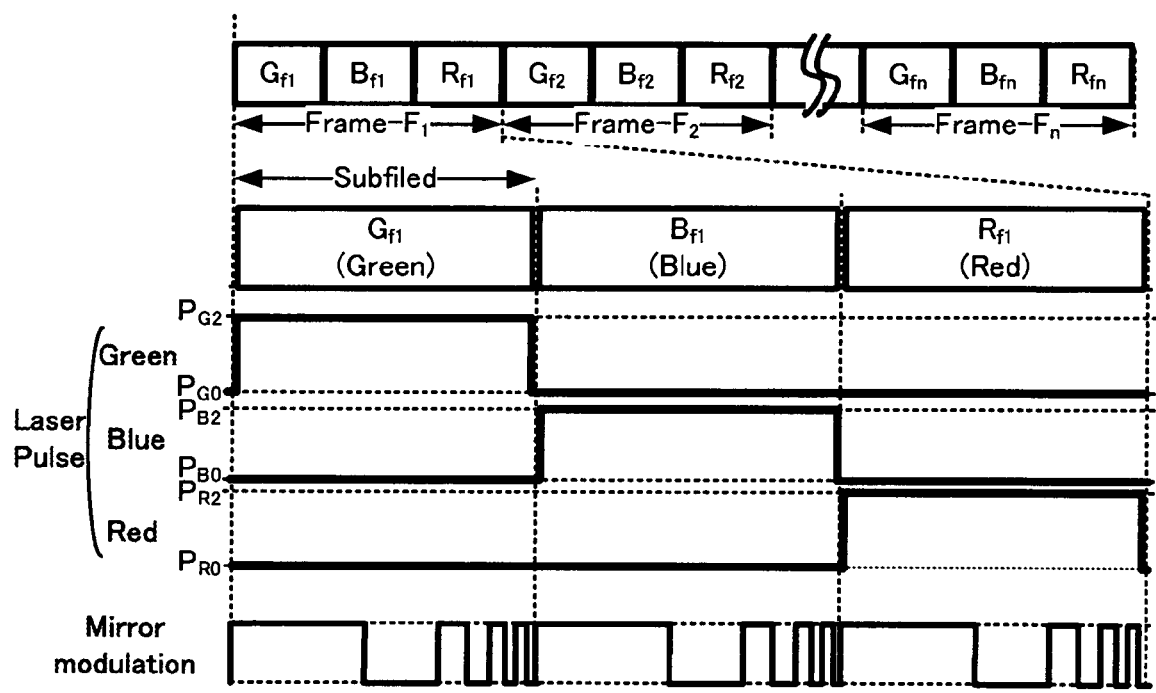
FIG. 2 is a timing chart of a color sequential control in a conventional single-panel system.

The pixel data of the three colors RGB of a frame image to be displayed in frame $F_1$ (i.e., that of a frame image represented by an image signal input 101) is stored in the frame memory 104. The SLM controller 103a controls the SLM 105a on the basis of the pixel data read out from the frame memory 104. In the green subfield $G_{f1}$ of FIG. 7, micromirrors are controlled by PWM (Pulse Width Modulation), and the micromirrors are ON/OFF controlled on the basis of the green pixel data in frame $F_1$. When a similar PWM control as in FIG. 2 is used, for example, the SLM 105a may read out the bits of pixel data from the frame memory 104 in accordance with the start of PWM control time periods that correspond to the respective bits, starting from MSB.

In the subsequent blue subfield $B_{f1}$, blue light from the blue laser light source 136b is emitted with the light intensity $P_{B2}$, and the SLM controller 103a controls the SLM 105a on the basis of the pixel data representing blue in the same way as in the green subfield $G_{f1}$. Green light and red light are not emitted at the blue subfield $B_{f1}$.

Also, in the subsequent red subfield $R_{f1}$, red light from the red laser light source 136r is emitted with the light intensity $P_{R2}$, and the SLM controller 103a controls the SLM 105a on the basis of the pixel data representing red. Green light and blue light are not emitted at the red subfield $R_{f1}$.

As described above, control is sequentially performed at respective green, blue, and red subfields $G_{f1}$, $B_{f1}$, and $R_{f1}$, and the process shifts to the control of frame $F_2$ At the start of green subfield $G_{f2}$ (or in a blanking interval between frame $F_1$ and $F_2$), the light intensity of the green laser light source 136g is adjusted to $P_{G1}$, the light intensity of the blue laser light source 136b is adjusted to $P_{B1}$, and the light intensity of the red laser light source 136r is adjusted to $P_{R1}$. Then, in the same way as with frame $F_1$, the SLM controller 103a controls the SLM 105a on the basis of a frame image to be displayed in frame $F_2$. The light source controller 110 controls the switching circuits $SW_G$, $SW_B$, and $SW_R$ of the light source driver 111a so that only the green laser light source 136g emits light at the green subfield $G_{f2}$, only the blue laser light source 136b emits light at the blue subfield $B_{f2}$, and only the red laser light source 136r emits light at the red subfield $R_{f2}$.

In frame $F_2$, the light intensity of the blue laser light source 136b and the red laser light source 136r may not be set at the start of the green subfield $G_{f2}$. The setting of these intensities can be performed at any arbitrary point prior to the start of the subfield $B_{f2}$ and $R_{f2}$, respectively.

As described above, control is sequentially performed at respective green, blue, and red subfields $G_{f2}$, $B_{f2}$, and $R_{f2}$, and then the process shifts to the control of frame $F_3$ (the control of frame $F_3$ is not shown in FIG. 7). Subsequently, the same control as in the above-mentioned frame $F_1$ is performed in frames $F_{2j-1}$, and the same control as in the above-mentioned frame $F_2$ is performed in frames $F_{2j}$ (j represents an integer larger than or equal to 1).

In other words, the light profile 301g of the green laser light source 136g includes the following patterns:

(1) maintaining the light intensity level of the green laser light source 136g at $P_{G2}$ in green subfields $G_{f2j-1}$ of the frames $F_{2j-1}$;

(2) maintaining the light intensity level of the green laser light source 136g at $P_{G1}$ in green subfields $G_{f2j}$ of the frames $F_{2j}$; and (3) maintaining the light intensity level of the green laser light source 136g at $P_{G0}$ (i.e., maintaining the green laser light source 136g switched off) in blue and red subfields.

The light profiles 301b and 301r of, respectively, the blue laser light source 136b and the red laser light source 136r include the patterns varying from frame to frame similar to those of the light profile 301g of the green laser light source 136g described above.

In the embodiment of FIG. 7, a (2j−1)th frame image is the frame image represented by an original image signal input 101, and a (2j)th frame image is the interpolation frame image generated by the frame generator 130. In such cases, the frame image generated from interpolation displays images with a smoother movement and further achieves finer gradations in the display gray scale mainly in the portion of the image where few or no movement is present.

The ratio of the intensity of illumination light of green light between green subfields $G_{f2}$ and $G_{f1}$ is $(P_{G1}/P_{G2})$, and the resolution of gray scale in the subfield $G_{f1}$ is improved to $(P_{G2}/P_{G1})$ times finer than that in the subfield $G_{f1}$. Accordingly, by varying, from one frame to another, the intensity of illumination light from the adjustable light source 112a as in FIG. 7, a smoother gray scale display can be achieved with the data for displaying a frame of image of the same number of bits.

Figure 8:
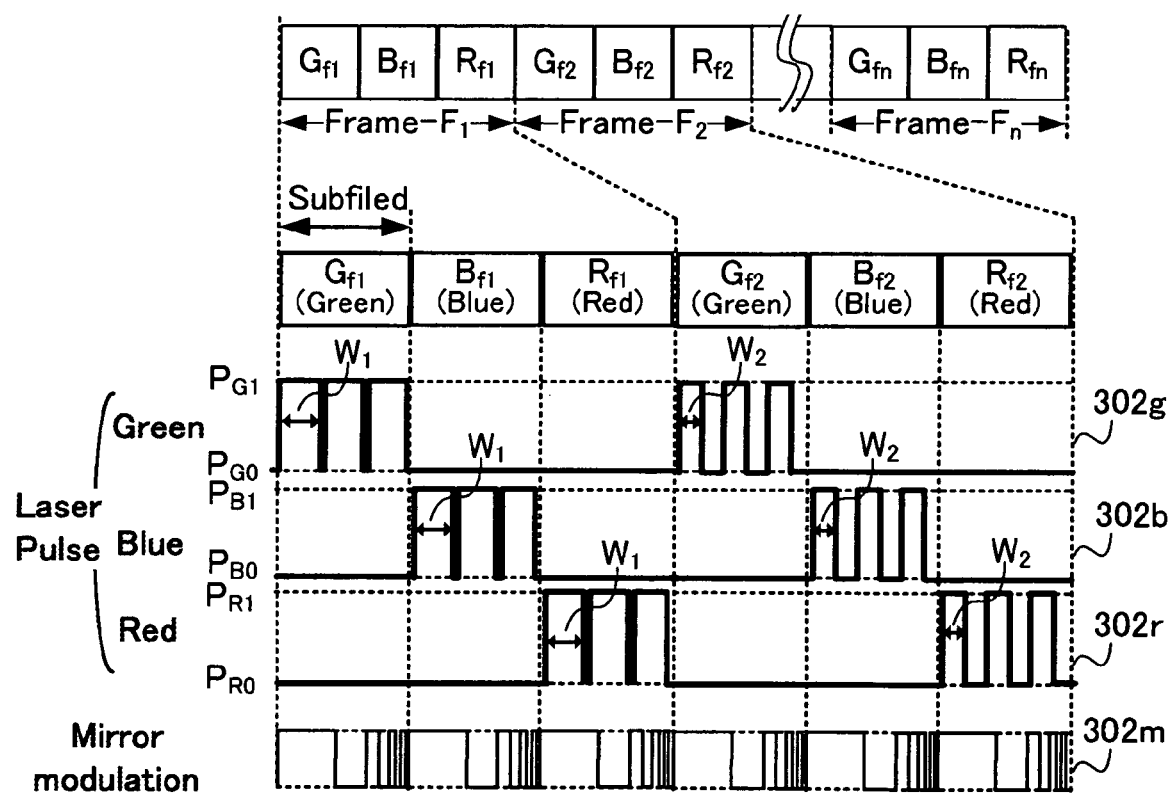
FIG. 8 is a timing chart of a color sequential control in a single-panel projection system using an adjustable light source according to an embodiment of the present invention.

Next, another exemplary control of the adjustable light source 112a is described with reference to FIG. 8. FIG. 8 is a timing chart of a color sequential control in a single-panel projection system using an adjustable light source according to an embodiment of the present invention.

In the example of FIG. 8, as in that of FIG. 7, the light profile 302 of the green laser light source 136g has different patterns between frames $F_{2j-1}$ and $F_{2j}$. The same can be said about the light profiles 302b and 302r of the blue laser light source 136b and the red laser light source 136r, respectively.

In the example of FIG. 8, the adjustable light source 112a, i.e., laser light sources, can perform a pulse emission.

Also, the following relationships are shown in FIG. 8.

$P_{G0} < P_{G1}$ $P_{B0} < P_{B1}$ $P_{R0} < P_{R1}$ where $P_{G0}=P_{B0}=P_{R0}=0$. $P_{G1}$, $P_{B1}$, and $P_{R1}$ are the level required for displaying an image on the screen 108 with a necessary brightness. Similar to the example of FIG. 7, the necessary brightness is determined, for example, on the basis of the specification and/or the gray scale characteristics of the projection system 100a, and the values of $P_{G1}$, $P_{B1}$, and $P_{R1}$ are not necessarily the same. Hereinafter, the descriptions of FIG. 8 similar to FIG. 7 are not repeated here for the sake of brevity.

In the example of FIG. 8, a color sequential control on the first frame $F_1$ is performed as follows.

First, in the green subfield $G_{f1}$, the light source controller 110 controls a green laser light source 136g to emit pulses of light. The frequency of emission is preferably a higher frequency than that of the control of the SLM 105a. When the SLM 105a is controlled by the PWM, for example, the light emission cycle is preferably shorter than the time period that corresponds to the LSB. The light profiles 302g, 302b, and 303r depicted in FIG. 8 are not intended to represent a preferred frequency of emission.

The light source controller 110 controls the light source driver 111a for controlling the emission state of the green laser light source 136g. The light source driver 111a drives the green laser light source 136g (i.e., by controlling the light source driver 111a to switch ON/OFF the switching circuit $SW_G$) in accordance with the light profile 302g.

Also, in the green subfield $G_{f1}$, the light source controller 110 controls the switching circuit $SW_B$ and $SW_R$ in the light source driver 111a to operate in an OFF state to turn off the blue laser light source 136b and the red laser light source 136r.

The SLM controller 103a applies the pixel data representing the green sub-fields stored in the frame memory 104 to control the SLM 105a. Also in the example of FIG. 8, the PWM is adopted.

Similarly, in the blue subfield $B_{f1}$ and the red subfield $R_{f1}$, the light source controller 110 controls the light source driver 111a for controlling respectively the emission states of the blue laser light source 136b and the red laser light source 136r to drive the blue laser light source 136b and the red laser light source 136r in accordance with the light profiles 302b and 302r, respectively.

The above thus described the control processes sequentially carried out in the green, blue, and red subfields $G_{f1}$, $B_{f1}$, and $R_{f1}$. The emission frequencies of the laser light sources of each color may differ from the others. The duty cycles of pulses of the laser light sources of each color may also differ from the others. The data of light profiles 302g, 302b, and 302r may be, for example, the data designating the emission frequency and pulse width, or may be the data designating a duty cycle.

Subsequent to the control of frame $F_1$, the process proceeds to control of frame $F_2$. In the control of frame $F_2$, the emission pulse width is changed from $w_1$ to $w_2$, with an emission frequency equal to that in frame $F_1$. Specifically, the duty cycle of the emission pulse is changed. Details of the controls of the laser light sources and the SLM are similar to those in frame $F_1$.

As described above, control processes for controlling the green, blue, and red subfields $G_{f2}$, $B_{f2}$, and $R_{f2}$ are sequentially performed, and then the process proceeds to control of frame $F_3$ (not shown). Subsequently, the same control processes as that of frame $F_1$ above are carried out in frames $F_{2j-1}$, and the same control processes as that of frame $F_2$ above are carried out in frames $F_{2j}$ (with j representing an integer larger than or equal to 1).

Comparing the green subfields $G_{f1}$ and $G_{f2}$ in FIG. 8 the light intensities of the pulses are equal to each other ($P_{G1}$) and the emission frequencies are also equal to each other, but the pulse widths are different from each other. In other words, the duty cycle of a pulse is different between the subfields $G_{f1}$ and $G_{f2}$.

Accordingly, the intensity of illumination light from the green laser light source 136g per unit time changes depending on the pulse width. Specifically, according to the light profile 302g, the intensity of illumination light from the green laser light source 136g per subfield is different between frames $F_{2j-1}$ and $F_{2j}$ depending on the emission pulse width, which is a kind of emission state. The light profiles 302b and 302r of the blue laser light source 136b and the red laser light source 136r also have patterns of variation from frame to frame.

Also in the embodiment of FIG. 8, the (2j–1)th frame may display a frame image represented by the original image signal input 101, and the (2j)th frame may display an interpolation frame image generated by the frame generator 130. Similar to the example of FIG. 7, in the example of FIG. 8, the effects of achieving a smoother display of motion and increasing the number of gray scale gradations occur mainly in the portion of the image where there is little or no motion.

Figure 9:
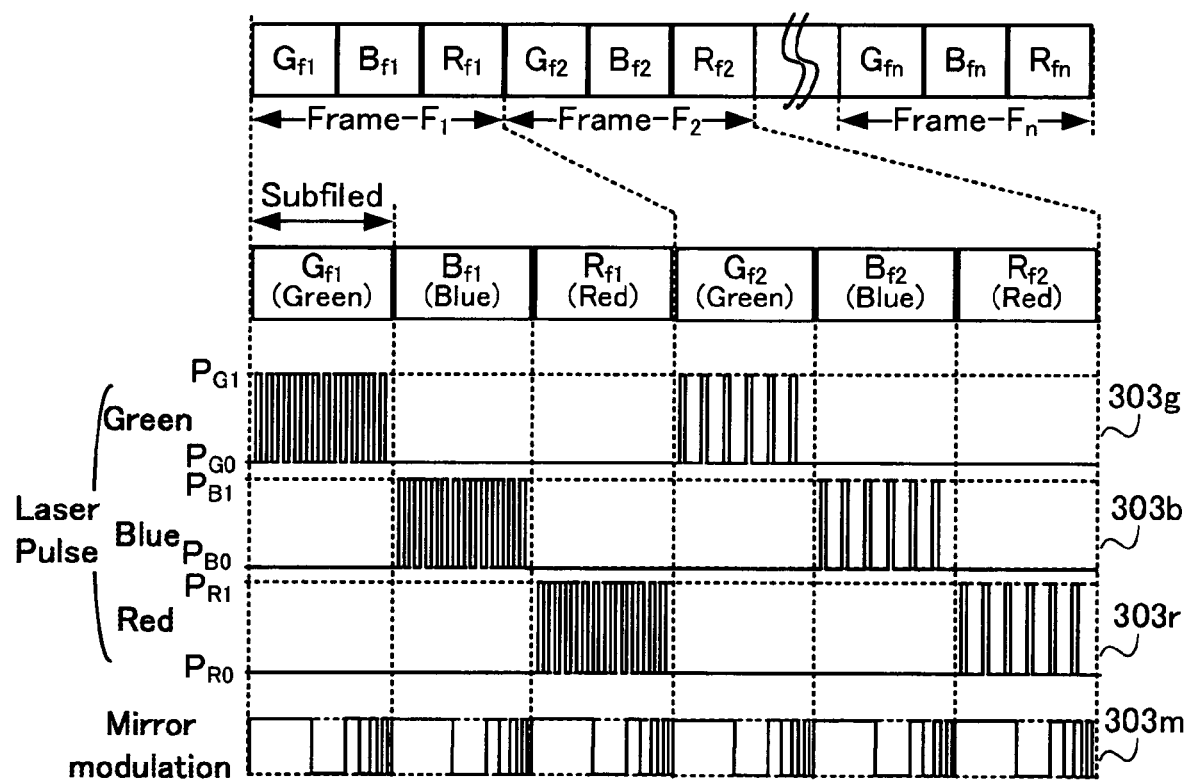
FIG. 9 is a timing chart of a color sequential control in a single-panel projection system using an adjustable light source according to an embodiment of the present invention.

Next, another exemplary control of the intensity of illumination light from the adjustable light source 112a is explained, with reference to FIG. 9. FIG. 9 is a timing chart of a color sequential control in a single-panel projection system using an adjustable light source according to an embodiment of the present invention.

In the example of FIG. 9, pulse emission of the green laser light source 136g, the blue laser light source 136b, and the red laser light source 136r are controlled so that the intensity of illumination light from the aforementioned laser light sources is different for each frame, similar to the example of FIG. 8. Other similarities to FIG. 8 are omitted for the sake of brevity.

The differences between FIG. 8 and FIG. 9 are as follows. In the example of FIG. 8, laser light sources emit pulsed light for frames at an equal frequency, and the duty cycle of emission pulses are changed for every frame; thereby, the display gray scale gradations in each frame are changed. In the example of FIG. 9, a control is performed such that the duty cycle or pulse width of pulse emission in each subfield is constant and the pulse emission frequency is changed for every frame. The emission frequency depicted in FIG. 9 is not representative of a preferred frequency, but pulse emission is preferably performed at a frequency compatible with a control of the SLM 105a. When the SLM 105a is PWM controlled, for example, it is preferable that light emission cycle is shorter than the time period for LSB.

In the example of FIG. 9, the frequency of pulse emission in the green subfield $G_{f2}$ is controlled to be half the frequency of the green subfield $G_{f1}$. As mentioned above, the emission pulse width among subfields is constant. Therefore, the intensity of illumination light from the green laser light source 136g per unit time changes depending on the pulse emission frequency. According to a light profile 303g, the intensity of illumination light from the green laser light source 136g per subfield is different between frames $F_{2j-1}$ and $F_{2j}$ depending on the emission frequency, which is a kind of emission state. Alternately, the emission frequency of FIG. 9, can also be referred to as the number of emissions.

The light profiles 303b and 303r of the blue laser light source 136b and the red laser light source 136r also have patterns varying from frame to frame. The light source controller 110 also controls, in a similar manner, the blue laser light source 136b and the red laser light source 136r on the basis of the light profiles 303b and 303r, respectively.

In the embodiment of FIG. 9, the (2j–1) th frame may display a frame image represented by the original image signal input 101, and the (2j)th frame may display an interpolation frame image generated by the frame generator 130. As in the examples of FIGS. 7 and 8, in the example of FIG. 9 the effects of achieving a smooth display of motion and increasing the number of gray scale gradations occur mainly in the portion of the image where there is little or no motion.

A timing control of the SLM controller 103a and the light source controller 110 by the sequencer 131 was briefly described in the description of FIG. 4 above. A more detailed description with reference to an exemplary case of FIG. 9 is as follows.

At minimum, the SLM 105a and the adjustable light source 112a are required to synchronously operate at the start of the subfields. For this reason, the sequencer 131 of FIG. 4 outputs the control signal representing the start timing of the subfields to the SLM controller 103a and the light source controller 110. However, finely-tuned synchronizations more than once per subfield is not always necessary.

In the example of FIG. 9, for convenience in drawing, the number of green light emission pulses in the subfield $G_{f1}$ is twelve. However, an emission/turn-off switching of laser light sources can be performed at a very high velocity. Depending on the embodiment, the frequency of emission pulse in one subfield is driven at a sufficiently high velocity compared with the control of an individual micromirror of the SLM 105a. Specifically, the green laser light source 136g is driven at a high velocity in which at least multiple emissions are performed within an LSB time period in a PWM control. In this case, the timing of individual emission pulses and the start timing of the time period of each bit in a PWM control are not necessarily strictly synchronized.

Even if the periods are not strictly synchronized, the intensity of illumination light from the green laser light source 136g in the time period of each bit depends mostly on the length of the time period of each bit, as long as the emission is at a sufficiently high velocity. Therefore, it is not necessary for the timing of individual pulse emissions and the timing for controlling the micromirrors to be synchronized more than once in one subfield. The lack of such a fine-tuned synchronization does not substantially affect the quality of a displayed image.

In order to indicate that the above-mentioned fine-tuned synchronization in one subfield is not essential but optional, the line connecting the SLM controller 103a and the system processor 109 is omitted in FIG. 3. As a matter of course, an embodiment can achieve the above-mentioned fine-tuned synchronization; in such an embodiment, the sequencer 131 of FIG. 4 may output control signals for fine-tuned synchronizations within one subfield, in addition to a control signal representing a start timing of a subfield to the SLM controller 103a and the light source controller 110.

Figure 10:
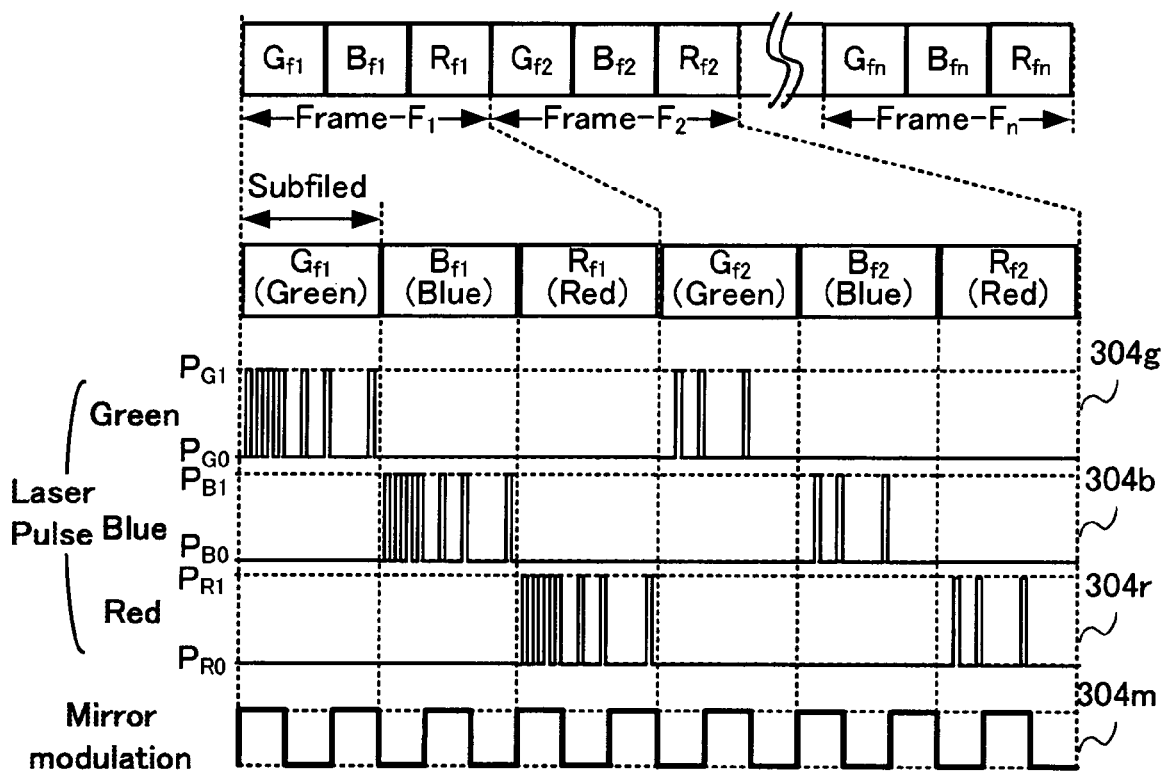
FIG. 10 is a timing chart of a color sequential control in a single-panel projection system using an adjustable light source according to an embodiment of the present invention.

Referring to FIG. 10 for another exemplary control process of the intensity of illumination light projected from the adjustable light source 112a. Specifically, FIG. 10 is a timing chart of a color sequential control in a single-panel projection system using an adjustable light source according to an embodiment of the present invention.

In the example of FIG. 10, the number of pulse emitted by the green laser light source 136g, the blue laser light source 136b, and the red laser light source 136r is controlled and the intensity of illumination light from the green laser light source 136g, the blue laser light source 136b, and the red laser light source 136r are adjusted from frame to frame. The control process has a feature similar to the control process shown in FIG. 9. Furthermore, the intensity of the laser light sources is also adjustable to at least two levels, as in FIG. 9; therefore, further descriptions of the control processes are not repeated here.

In the example of FIG. 10, when a piece of pixel data is n-bit long, one subfield is equally divided into n time periods and each of n time periods is assigned to each bit. For convenience in drawing, in FIG. 10, a case in which "n=3" is shown as depicted in a mirror modulation control waveform 304m of the SLM 105a. In practice, "n" may be a larger number such as 8.

Here, LSB, the second least significant bit, . . . , and the most significant bit are referred to as the first bit, second bit, . . . , and n-th bit, respectively. Note that "$1 \leq k \leq n$" hereafter.

In the example of FIG. 10, a control is performed such that the number of pulse emissions in the time period corresponding to the k-th bit in one subfield is $(2^{k-1})$ times the number of emissions in the time period corresponding to the first bit. In other words, because the pulse width remains constant, a control is performed in one subfield in such a way that the frequency of pulse emission in the time period corresponding to the k-th bit is $(2^{k-1})$ times the frequency in the time period corresponding to the first bit.

As a result, the intensity of illumination light in time periods corresponding to each bit is controlled depending on the position of the bits.

More specifically, in the green subfield $G_{f1}$ of the first frame $F_1$, the light source controller 110 controls the green laser light source 136g in accordance with a light profile 304g so that the green laser light source 136g emits pulsed light. In FIG. 10, for convenience in drawing, a case where a piece of pixel data is represented by n=3 bits is shown. In this case, for example, in the green subfield $G_{f1}$, a pulse emission is performed one time for the time period corresponding to the first bit, pulse emissions are performed "$1 \cdot 2^{2-1}=2$" times for the time period corresponding to the second bit, and pulse emissions are performed "$1 \cdot 2^{3-1}=4$" times for the time period corresponding to the third bit. Note that the values "1, 2, and 4" mentioned above are example values and are not intended to designate preferable values. In the green subfield $G_{f1}$, the blue laser light source 136b and the red laser light source 136r do not emit light since the switching circuits $SW_B$ and $SW_R$ of FIG. 5 are controlled to be switched OFF.

Further, in parallel with the above-mentioned control of adjustable light source 112a by the light source driver 111a, the SLM controller 103a controls the SLM 105a in accordance with the pixel data expressing green stored in the frame memory 104. As described above, the micromirrors of SLM 105a are driven to an ON/OFF state for every time period corresponding to each bit.

In the next blue subfield $B_{f1}$, the blue laser light source 136b performs a pulse emission based on a similar control. In parallel with this, the SLM controller 103a controls the SLM 105a in accordance with the pixel data expressing blue stored in the frame memory 104. In the succeeding red subfield, a control is performed in a similar way.

Next, the process shifts to a control of frame $F_2$. The subfields of frame $F_2$ are controlled in a similar way as the subfields of frame $F_1$. However, the number of emissions in the time periods corresponding to each bit is different between frames $F_1$ and $F_2$ (in other words, the frequency of pulse emission in the time periods corresponding to each bit is different between frames $F_1$ and $F_2$).

Also similar to frame $F_1$, in one subfield of frame $F_2$, the number of pulse emissions in the time period corresponding to a k-th bit is controlled to $(2^{k-1})$ times as the number of emissions in the time period corresponding to the first bit. However, the number of emissions in the time period corresponding to the first bit is different between the frames $F_1$ and $F_2$.

For this reason, when focusing on the green subfield as an example, the number of emissions of the green laser light source 136g in one subfield is different between the frames $F_1$ and $F_2$. In other words, a duty cycle varies from frame to frame. Accordingly, the intensity of illumination light from the green laser light source 136g in one subfield varies between the frames $F_1$ and $F_2$. The same can be said of the subfields of blue and red. That is, the adjustable light source 112a is controlled such that the intensity of illumination light is varied from frame to frame. The point at which the intensity of illumination light is varied from frame to frame in the example of FIG. 10 is similar to the examples of FIGS. 7 through 9.

Specifically, as shown in the drawing, in the green subfield $G_{f2}$ of frame $F_2$, a pulse emission is performed zero times (to which 0.5 times is truncated) for the time period corresponding to the first bit; pulse emission is performed one (i.e., "$0.5 \cdot 2^{2-1}=1$") time for the time period corresponding to the second bit in the green subfield $G_{f1}$, and pulse emissions are performed "$0.5 \cdot 2^{3-1}=2$" times for the time period corresponding to the third bit. Note that "0.5" is truncated here, but as described above, the number of emissions shown in the light profile 304g is merely for convenience in drawing.

In fact, the number of emissions during a time period corresponding to a first bit in the green subfield $G_{f2}$ is at least 1 or more, and may range from tens to hundreds. Accordingly, regardless of the time periods corresponding to any bit, the ratio of the number of emissions between the subfields $G_{f1}$ and $G_{f2}$ is fixed.

Also in the blue subfield $B_{f2}$ and the red subfield $R_{f2}$, the blue laser light source 136b and the red laser light source 136r are controlled so that the intensity of illumination light is different from frame $F_1$. Accordingly, in FIG. 10 also, the intensity of illumination light of the adjustable light source 112a is controlled on a frame-by-frame basis. In and after the third frame $F_3$, the process is continued in a similar way.

In the example of FIG. 10, the projection system 100a may display a frame image represented by the original image signal input 101 at (2j−1)th frame and display the interpolation frame image generated by the frame generator 130 at (2j)th frame. In this case, the intensity of illumination light in the (2j)th frame is set to be lower than the intensity of illumination light in the (2j−1)th frame, and thus an improvement in image quality is expected.

In FIG. 10, an example is shown in which the intensity of illumination light from the adjustable light source 112a is changed by changing the number of emissions per frame (in other words, by changing the emission frequency on a frame-by-frame basis), but the intensity of illumination light may also be changed by changing the light intensity or pulse width. FIG. 10 is merely a typical embodiment, including:
  maintaining the relative relationships among patterns of a light profile in time periods corresponding to each bit within one subfield;
  changing a parameter/parameters defining the pattern of a light profile (for example: emission frequency, the number of emissions, light intensity, or pulse width, etc.) on a frame-by-frame basis; and
  thereby, changing the intensity of illumination light from frame to frame.

In other words, the example of FIG. 10 exemplifies changing the intensity of illumination light from the adjustable light source 112a per unit time, with the unit time being the length of one frame. The emission state of the adjustable light source 112a is changed by changing the patterns of pulse emissions in accordance with individual frames while maintaining the relative relationships among the plural patterns in a frame.

Exemplary controls on the intensity of illumination light from the adjustable light source 112a have been described with reference to FIGS. 7 through 10, but the above examples may be modified and in various embodiments.

FIGS. 7 through 10 illustrate cases in which light profiles with a period of two frames are used, but the period of a light profile may be longer than or equal to three frames. For example, when the period is three frames long, a control similar to that in frame $F_1$ of FIG. 7 may be performed on the (3j−2)th frame, and a control similar to that in frame $F_2$ of FIG. 7 may be performed on the (3j−1)th and (3j)th frame. The embodiments in FIGS. 8 through 10 may be modified in a similar way. When the frame generator 130 generates two sheets of interpolation frame images in between the frame images 201 and 202 of FIG. 6, resulting in the frame rate of 180 fps, for example, such a control with a three-frame-long period is preferable.

FIGS. 7 through 10 exemplify that the (2j−1)th frame displays a frame image expressed by the original image signal input 101 and that the (2j)th frame displays an interpolation frame image generated by the frame generator 130. However, when no frame interpolation is performed and only frame images represented by the original image signal input 101 are displayed, the light source controller 110 may also perform a control to vary the intensity of illumination light from the adjustable light source 112a on a frame-by-frame basis, as described above.

For example, a control may be switched depending on the brightness of a frame image. That is, a control similar to that performed on the above-mentioned (2j−1)th frame may be performed on a bright image frame, and a control similar to that performed on the above-mentioned (2j)th frame may be performed on a dark image frame. In this case, the intensity of illumination light from the adjustable light source 112a is controlled on a frame-by-frame basis, but there is no periodicity in that control. Also, the image processor 102 may be configured, for example, to calculate the mean value of pixel data of all pixels to determine a frame as a "bright frame" if the mean value is higher than or equal to a threshold value, or as a "dark frame" if the mean falls below that value, and to output the determination result to the light source controller 110. The brightness of a frame may also be determined on the basis of other criteria.

In the examples above, the intensity of illumination light from the adjustable light source 112a is controlled in each frame to one of the two levels. However, an embodiment is obviously possible in which the intensity of illumination light from the adjustable light source 112a is controlled to three or more levels on a frame-by-frame basis.

Note that all of FIGS. 7 through 10 exemplify a case in which micromirrors of the SLM 105a are driven to either an ON or OFF state. However, micromirrors may also be driven to other states.

For example, the SLM controller 103a may perform a control so that a micromirror is oscillated and set to the intermediate oscillation state described with reference to FIG. 3. Such a control is referred to as an "oscillation control" hereinafter. By performing an oscillation control, the intensity of light reflected to the projection light path towards the screen 108 can be controlled to be at an intermediate level between the intensity of light reflected when a micromirror is fixed to an ON state and the intensity of light reflected when a micromirror is fixed to an OFF state.

When oscillation control is used, it is preferable that the timing of pulse emissions is defined in a light profile, taking the deflection angle of a micromirror into account. Further, it is preferable that the timing of a pulse emission be synchronized with the phase of the deflection angle of a micromirror more than once per subfield. For this purpose, the sequencer 131, for example, may output a control signal for such a fine-tuned synchronization to both the SLM controller 103a and light source controller 110.

Here, a preferable timing of a pulse emission is described with reference to FIGS. 11A through 11C. For convenience of description, the control during the green subfield, in which the green laser light source 136g is the light source, is described as an example, but the same control can be applied during the blue and red subfields.

Figure 11A:
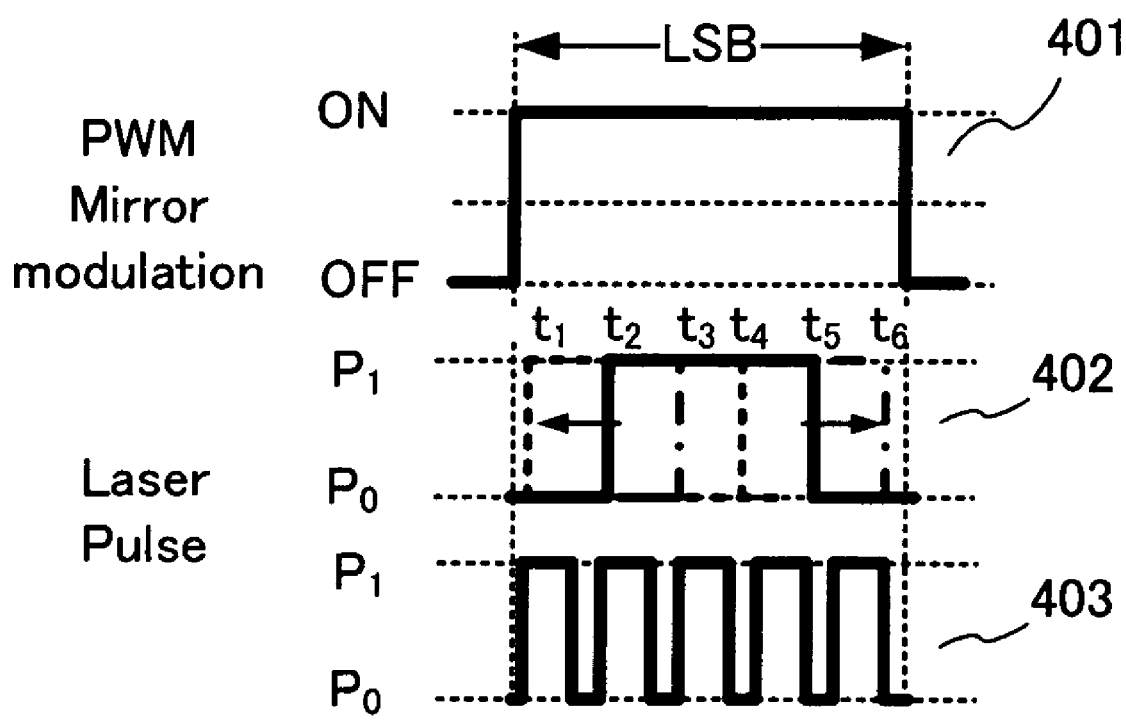
FIG. 11A is an exemplary light profile when a pulse width modulation is performed in a spatial light modulator.

FIG. 11A exemplifies a light profile for a case in which a PWM control is performed in the SLM 105a. Hereinafter, the embodiment is described as an example in which micromirrors of the SLM 105*a* are under a PWM control in order to perform the gray scale display of n bits for respective RGB colors. In this case, "LSB" is the least significant bit out of n bits, and the brightness of respective RGB colors have $2^n$ steps.

The resolution of the brightness of green light in the image projected onto the screen 108 depends on the intensity of light emitted from the green laser light source 136*g* during the time period corresponding to the LSB. That is, the length of the time period corresponding to the LSB specifies the minimum gradation step of the display.

When a PWM control is performed and the LSB value of pixel data representing green is "1", a mirror modulation control waveform 401 in the green subfield becomes as shown in FIG. 11A. Specifically, the micromirror is maintained at the deflection angle of an "ON" state throughout the time period corresponding to the LSB.

A light profile causing the green laser light source 136*g* to provide the lowest intensity of light corresponding to the LSB needs to have a pattern in which the pulse emission of the green laser light source 136*g* is included within the time period of the LSB. Note that various patterns of light profiles may be adopted. This is because the micromirror maintains a constant deflection angle within the time period of the LSB, and thus the state of light reflection at the micromirror is constant. Accordingly, the timing of emission pulses may be flexibly controlled to multiple adjustable characteristics of the pulse emissions.

For example, as shown by the solid line representing a light profile 402, the light source controller 110 may control the light source driver 111*a* so that the light source driver 111*a* cause the green laser light source 136*g* to emit light as a pulse with the light intensity $P_1$ between time $t_2$ and time $t_5$, within the time period of the LSB.

Alternatively, the timing for emission may be advanced so that the light source controller 110 controls the light source driver 111*a* to cause the green laser light source 136*g* to emit light as a pulse between time $t_1$ and time $t_4$, also within the time period of the LSB, with the same pulse width as the light profile 402. Inversely, the timing for emission may be delayed so that the light source controller 110 controls the light source driver 111*a* to cause the green laser light source 136*g* to emit light as a pulse between time $t_3$ and time $t_6$, also within the time period of the LSB, with the same pulse width as the light profile 402.

Also, the number of pulse emissions in the time period of the LSB is not limited to one pulse, as shown in the example of light profile 402. A light profile such as the light profile 403, in which a number of emissions are repeated, may be adopted.

Note that due to space limitations in FIGS. 7 through 10, some of the emission pulses included in the time period of the LSB are not shown for convenience in drawing. However, at least in the frame in which the adjustable light source 112*a* is controlled to emit the highest intensity of illumination light relative to a number of other frames (for example, frame $F_1$ in FIGS. 7 through 10), the adjustable light source 112*a* emits light at the time period of the LSB, as described in FIG. 11A. Also, in the frame in which the adjustable light source 112*a* is controlled to emit a relatively low intensity of illumination light (for example, frame $F_2$ in FIGS. 7 through 10), it is desirable that a light emission be included in the time period of the LSB, as shown in FIG. 11A.

In comparison with the PWM control described above, with reference to FIG. 11A, an example using an oscillation control is now described with reference to FIG. 11B and FIG. 11C. When an oscillation control is performed, not only is it desirable that a pulse emission be included in the time period of the LSB, but it is also desirable that an emission be synchronized with the phase of oscillation. Specifically, it is desirable that the phase of oscillation and the timing of emissions be in a certain relationship.

Figure 11B:
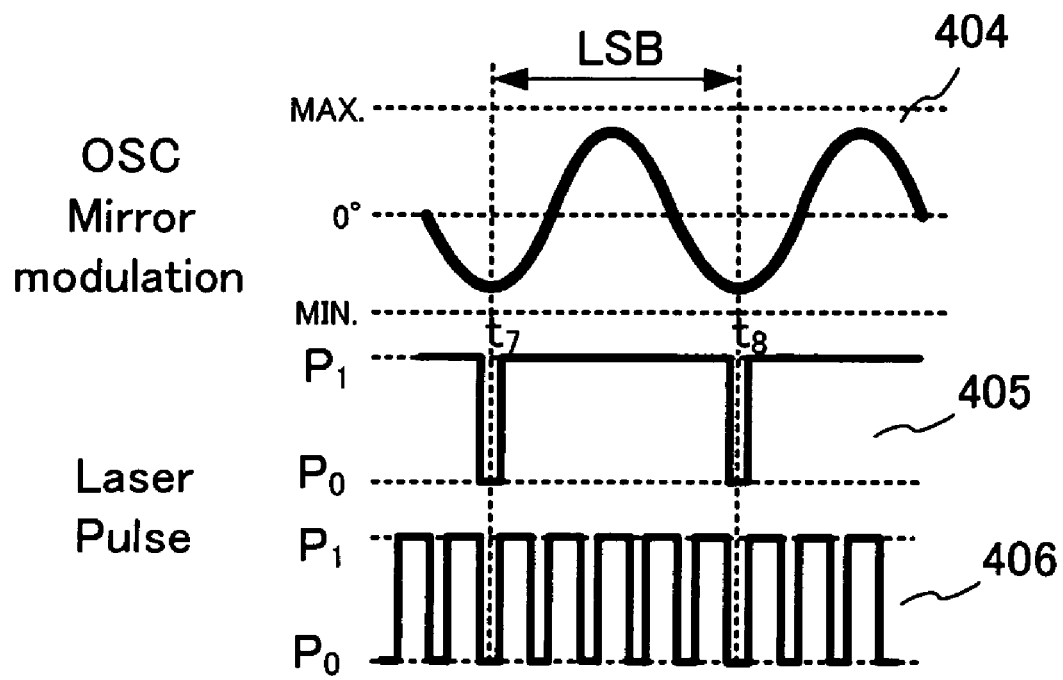
FIG. 11B is an exemplary light profile when an oscillation control is performed in a spatial light modulator.
Figure 11C:
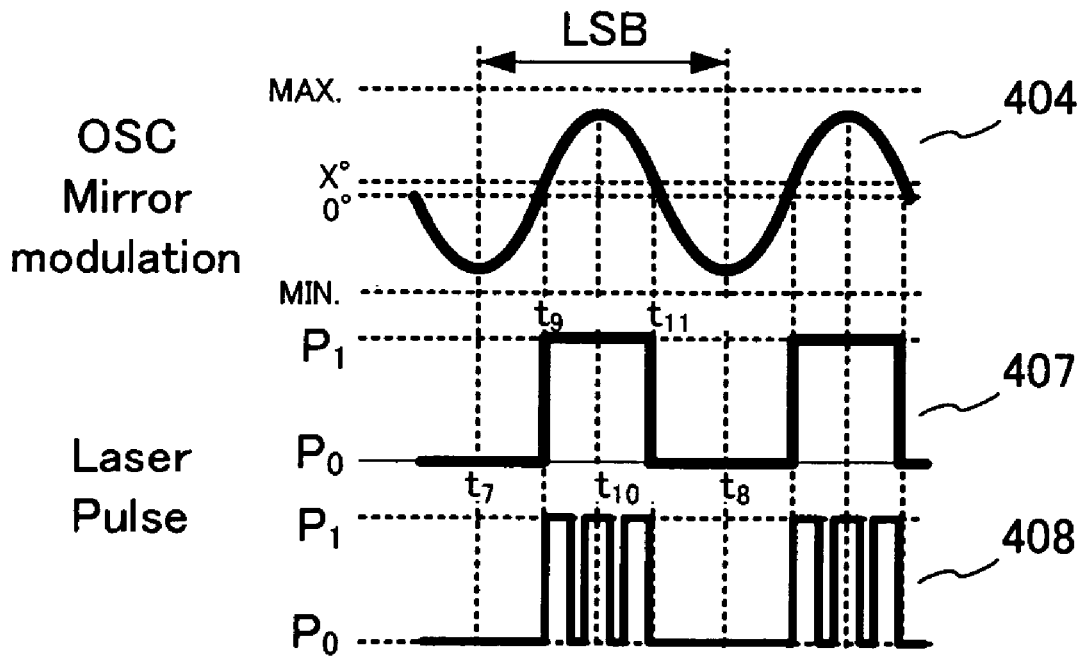
FIG. 11C is an exemplary light profile when an oscillation control is performed in a spatial light modulator.

FIG. 11B and FIG. 11C exemplify light profiles for performing an oscillation control. When performing an oscillation control, the length of the period in which a micromirror oscillates is the smallest unit of time for the control. FIG. 11B and FIG. 11C illustrate an example in which the period of a micromirror oscillation is adopted as the time period of the LSB.

In FIG. 11B and FIG. 11C, the period from time $t_7$, at which a deflection angle of a micromirror comes closest to the deflection angle of an "OFF" state (i.e., the angle shown as "MIN" in the drawing), to time $t_8$, at which a deflection angle of a micromirror also approaches "MIN,", is shown as the time period of the LSB. As shown as a mirror modulation control waveform 404 in FIG. 11B and FIG. 11C, between time $t_7$ and $t_8$, the deflection angle of a micromirror moves in the following sequence: it starts from a state of being closest to a deflection angle "MIN", then moves to 0°, an angle closest to the deflection angle of an "ON" state (i.e., angle shown as "MAX"), to 0° again, then back to the angle closest to a deflection angle "MIN".

The closer the phase of the mirror modulation control waveform 404, i.e., the deflection angle of a micromirror, gets to a deflection angle "MAX", the greater intensity of light there is reflected from the SLM 105*a* to a projection light path towards the screen 108. When the deflection angle is below 0°, for example, almost no light is reflected to the projection light path towards the screen 108. In the oscillation control of a micromirror, the micromirror is constantly in a transition state, and the light reflected to the projection light path towards the screen 108 varies depending on the transition state of the micromirror, i.e., depending on the deflection angle of the micromirror.

If there is a light profile in which an emission is performed only when the deflection angle of a micromirror is below 0°, even if the adjustable light source 112*a* emits light, almost no light is reflected to the projection light path towards the screen 108, and thus the image is not displayed. Therefore, in the light profile, the phase of the mirror modulation control waveform 404 must be taken into account.

Light profiles 405 through 408 shown in FIG. 11B and FIG. 11C are exemplary light profiles in which the phase of the mirror modulation control waveform 404 is taken into account. Light profiles 405 and 406 exemplify cases of maintaining a uniform pattern from time $t_7$ to $t_8$, i.e., during the time period of the LSB, and the light profiles 407 and 408 exemplify cases in which the pattern is changed, corresponding to the phase of the mirror modulation control waveform 404, between time $t_7$ and $t_8$.

All of the light profiles 405 through 408 are light profiles for setting the light intensity to $P_0$ or $P_1$ at a certain timing so that the adjustable light source 112*a* performs a pulse emission, where $P_0 < P_1$, with $P_1$ representing "light emission" and $P_0$ representing "turn-off". The relationship may be $P_0 = 0$. When $P_0 = 0$, pulse emissions can be controlled by ON/OFF control of the switching circuit of FIG. 5.

Specifically, it is designated by the light profile 405 to control the adjustable light source 112*a* (e.g., the green laser light source 136*g* included in the adjustable light source 112*a*, when it is a green subfield) to emit light while maintaining the light intensity at $P_1$ from time $t_7$ to $t_8$, i.e., during the time period of the LSB.

More precisely, in FIG. 11B, the light intensity is at $P_0$ for separating pulses from each other during the very short time periods surrounding time $t_7$ and time $t_8$. However, as shown in the mirror modulation control waveform 404, both time $t_7$ and time $t_8$ are times in which almost no light is reflected to the projection light path from the micromirror towards the screen 108. For this reason, the light profile 405 can essentially be considered to have a pattern in which an emission is maintained at constant light intensity $P_1$ across the time period of the LSB.

According to the light profile 405, emissions at the phase in which the reflectance of light to the projection light path from the micromirror towards the screen 108 is high are guaranteed (i.e., emissions at a peak portion of the mirror modulation control waveform 404 are guaranteed).

Similarly, according to the light profile 406, emissions at the phase in which the reflectance of light to the projection light path is high are also guaranteed. This is because the light profile 406 has a pattern in which pulse emissions at the light intensity of $P_1$ are regularly repeated at a sufficiently high frequency compared with the frequency of the mirror modulation control waveform 404 from time $t_7$ to $t_8$, i.e., during the time period of the LSB.

The intensity of light A to be projected from one micromirror corresponding to one pixel in the direction of the projection optical axis 118a during the time period of the LSB is determined in advance depending on, for example, the specification of the projection system 100a. The higher the frequency of the pulse emission designated by the light profile 406, the greater the number of times in which the light intensity is $P_1$ during the time period in which the phase of the mirror modulation control waveform 404 becomes more than 0°.

Accordingly, when the number of pulse emissions required to project the intensity of light A in the direction of the projection optical axis 118a from one micromirror are performed in the time period of the LSB, it is defined that the frequency of pulse emissions are a "sufficiently high frequency compared with the frequency of the mirror modulation control waveform 404". The light profile 406 of FIG. 11B indicates that there are five emissions between time $t_7$ to $t_8$, but the value "5" is used only as an example in the drawing. A light profile in which there are tens to hundreds of emissions between time $t_7$ and $t_8$ may be adopted.

As shown above, the light profiles 405 or 406 are characterized in that not only do they have patterns which take into account the phase of the mirror modulation control waveform 404 in the oscillation control, but also in that it is easy to control the timing of emissions, as they are constant patterns. Specifically, when the light profiles 405 or 406 are adopted, a finer-tuned control of timing shorter than the LSB is not necessary as long as the timing is controlled in units of the LSB.

Next, light profiles 407 and 408 of FIG. 11C are described.

As stated above, the reflectance of light to the projection light path in a micromirror varies depending on the mirror modulation control waveform 404. Here, the phase of the mirror modulation control waveform 404, in which the reflectance of light to the projection light path in a micromirror is at a certain threshold R, is referred to as X°. The relationship is 0<x<MAX.

In a time period of the LSB between time $t_7$ and $t_8$, time $t_9$, $t_{10}$, and $t_{11}$ are defined as follows.

There are two points of time at which the phase of the mirror modulation control waveform 404, i.e., the deflection angle of the micromirror, is X°. Time $t_9$ is one of the two that is closer to the time $t_7$.

Time $t_{10}$ is a time at which the phase of the mirror modulation control waveform 404 becomes the largest.

Of the two points of time at which the phase of the mirror modulation control waveform 404 is X°, time $t_{11}$ is the time closer to time $t_8$.

According to the definitions above, during the period of the LSB between time $t_7$ and $t_8$, the reflectance becomes larger than R only during the periods between time $t_9$ and $t_{11}$. Light profiles 407 and 408 illustrate an example in which emissions are performed only during the period between time $t_9$ and $t_{11}$. That is, as only a reflectance below R can be obtained in the time periods between time $t_7$ and $t_9$ and between time $t_{11}$ and $t_8$, the light profiles 407 and 408 make a designation not to perform an emission therein.

The light profile 407 designates a pulse emission that maintains the light intensity $P_1$ during the period between time $t_9$ and $t_{11}$.

The light profile 408 designates that pulse emissions are repeated during the period between time $t_9$ and $t_{11}$ at a sufficiently high frequency compared with the oscillation frequency of the mirror modulation control waveform 404. In the example shown in FIG. 11C, a "sufficiently high frequency" means a frequency in which pulse emissions are performed more than three times during the period between time $t_9$ and $t_{11}$.

As long as pulse emissions are performed more than three times during the period between time $t_9$ and $t_{11}$, an emission in the vicinity of time $t_{10}$ at which reflectance is the highest is guaranteed.

In the examples of FIG. 11B and FIG. 11C, the period of the mirror modulation control waveform 404 is adopted as the LSB, but a time period longer than the period of the mirror modulation control waveform 404 may be adopted as the LSB. In the latter case, similar to light profiles 405-408, it is also preferable to employ a light profile in which an emission is guaranteed during the period in which the phase of the mirror modulation control waveform 404 causes the reflectance of light reflected to the projection light path from a micromirror towards the screen 108 to satisfy a predetermined requirement.

Figure 12:
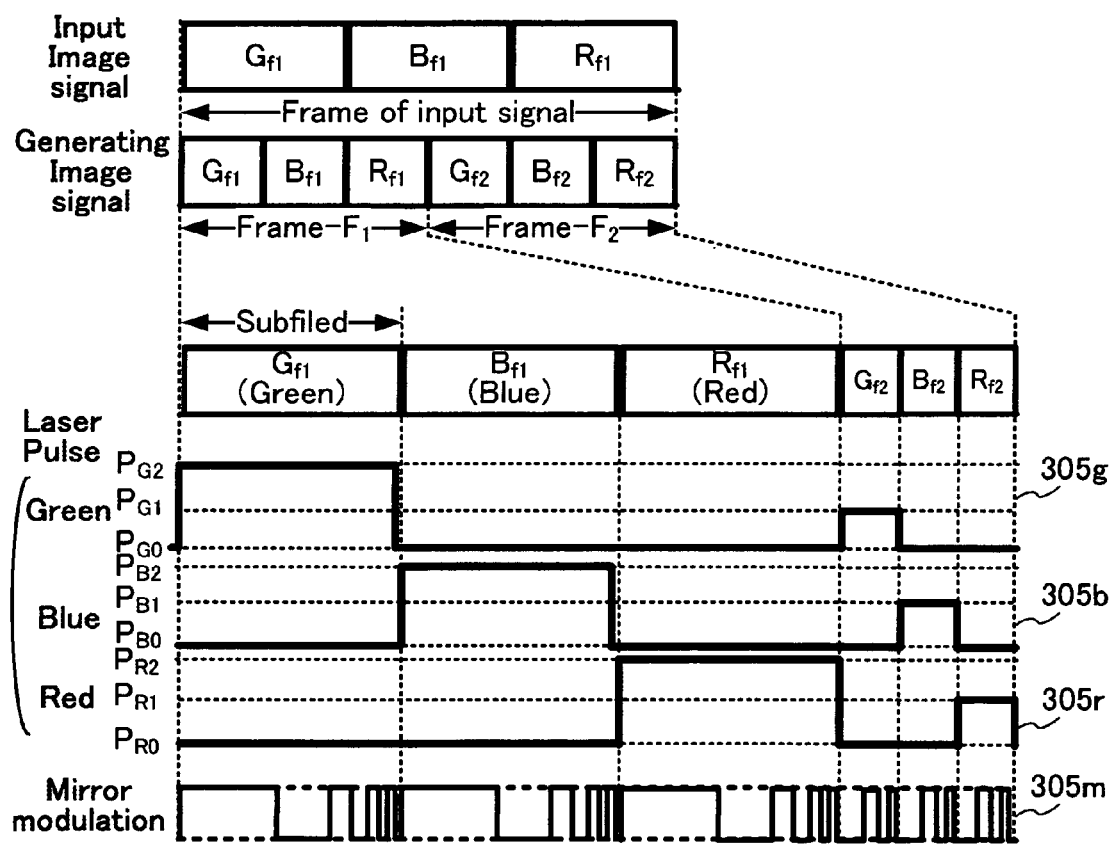
FIG. 12 is a timing chart of a color sequential control in a single-panel projection system using an adjustable light source according to an embodiment of the present invention.

Next, modification of the control of FIG. 7 is described with reference to FIG. 12. FIG. 12 is a timing chart of a color sequential control in a single-panel projection system using an adjustable light source according to an embodiment of the present invention. Also in the example of FIG. 12, the intensity of illumination light from the adjustable light source 112a per unit time is varied on a frame-by-frame basis, similar to the example of FIG. 7. The only difference between FIG. 12 and FIG. 7 is in the length of the frames. The first row in FIG. 12 is a conceptual diagram of the data of the first sheet of a frame image represented by an image signal input 101. For example, on the basis of the data of the first frame image and the data of the second frame image (not shown in FIG. 12), the frame generator 130 generates an interpolation frame image, and the frame memory 104 stores the data of the interpolation frame image.

The second row in FIG. 12 is a conceptual diagram of the first frame $F_1$ and the second frame $F_2$ to be displayed. A frame image that is represented by an image signal input 101 is displayed in the frame period of frame $F_1$, and a generated interpolation frame image is displayed in the frame period of frame $F_2$.

In the example of FIG. 7, the lengths of frame periods $F_1$ and $F_2$ are equal to each other. However, in the example of FIG. 12, the frame period of $F_1$ is longer than that of $F_2$. Also, in the following frames, the frame periods decrease so that frames $F_{2j-1}$ are longer than those of frames $F_{2j}$ (where j=1, 2 . . . ).

As shown in FIG. 12, both frames $F_1$ and $F_2$ are divided into the subfields of green, blue, and red. Then, the light source controller 110 controls the emission states of the respective green laser light source 136g, blue laser light source 136b, and red laser light source 136r on the basis of the light profiles 305g, 305b, and 305r, respectively.

For example, the light profile 305g is similar to the light profile 301g of FIG. 7 in the following ways: controlling the light intensity of the green laser light source 136g to be maintained at $P_{G2}$ in the green subfield $G_{f1}$; controlling the light intensity of the green laser light source 136g to be maintained at $P_{G1}$ in the green subfield $G_{f1}$; and controlling the light intensity of the green laser light source 136g to be maintained at $P_{G0}$ in the blue or red subfields. The only difference between light profiles 301g and 305g is in the timing of switching the subfields due to the length of the frames.

In FIG. 7, the SLM 105a is controlled by a PWM control corresponding to the same number of bits (e.g., 8 bits) in any of the frames, but in FIG. 12, PWM controls corresponding to different numbers of bits (e.g., 8 bits and 5 bits) are performed in the respective frames $F_{2j-1}$ and $F_{2j}$. The reason is described as follows.

Due to limitations in the driving velocity of a micromirror, there is a lower limit in the length of the time period of the LSB. Accordingly, there is a lower limit in the time required to control the SLM 105a by a PWM in response to the data of m bits.

For example, when the frame rate of a moving picture represented by an image signal input 101 is at 60 fps and the frame generator 130 generates interpolation frame images in order to double the frame rate, the length of a display period for each frame is $\frac{1}{120}$ second in FIG. 7, but the length of a display period for frame $F_2$ is shorter than $\frac{1}{120}$ second in FIG. 12. For this reason, in the display period of frame $F_2$, at most a 5-bit PWM control can be performed, with the value "5" here being an example value. On the other hand, in frame $F_1$ in which the display period is longer than $\frac{1}{120}$ second, an 8-bit PWM control can be performed, with the value "8" here also being an example value. Accordingly, in FIG. 12, the PWM controls corresponding to the different numbers of bits between frames $F_{2j-1}$ and $F_{2j}$ are performed.

According to the example of FIG. 12, the number of bits used in a PWM control is less in frame $F_{2j}$ than in frame $F_{2j-1}$. However, the resolution of brightness is determined by the length of the LSB and the intensity of illumination light from the adjustable light source 112a. Therefore, depending on the values of $P_{G1}$, $P_{B1}$, $P_{R1}$, $P_{G2}$, $P_{B2}$, and $P_{R2}$, and the ratio of the length of $F_{2j-1}$ to $F_{2j}$, a smoother expression of gradation is possible in frame $F_{2j}$ than in frame $F_{2j-1}$. In comparison with the example of FIG. 7, the length of time in frames $F_{2j-1}$ is longer in the example of FIG. 12, and thus brighter images are displayed.

As described above, in an image display including frames newly generated by processes such as interpolation, gray scale images at a higher resolution can be perceived by viewers by combining the frames in which display gray scale gradations are varied. This is because those display frames are perceived by viewers as an image integrated along the time axis. As a result, a display at a high gray scale gradation that does not depend on the reply speed of, for example, a display device, or on the processing speed of data, is achievable.

In the various exemplary controls described above with reference to FIGS. 7 through 12, the dynamic ranges of brightness are controlled so that they differ from each other in frame $F_{2j-1}$ and frame $F_{2j}$. In the example of FIG. 7, for example, the ratio of dynamic ranges of the brightness of green light in frame $F_{2j-1}$ and frame $F_{2j}$ is $P_{G2}:P_{G1}$. As described in the example of FIG. 7, the dynamic ranges of brightness may be varied on a frame-by-frame basis by controlling the level of the intensity of illumination light in frames $F_{2j-1}$ and $F_{2j}$. In a similar way, as shown in the examples of FIGS. 8 through 12, the dynamic ranges of brightness can also be controlled on the basis of the pulse width of an emission pulse, the duty cycle of a pulse, pulse emission frequency, the number of pulse emissions, and the like.

As shown in the example of FIG. 12, the dynamic ranges of brightness are also changed in accordance with the control method of the spatial modulator. When a micromirror is PWM controlled, for example, the dynamic ranges of brightness are adjusted depending on the number of bits that corresponds to one frame in the PWM control (e.g., the eight bits that correspond to frame $F_{2j-1}$, and the five bits that correspond to frame $F_{2j}$ in the example of FIG. 12).

In the examples of FIGS. 7 through 12, a control in which the gray scale characteristics are varied on a frame-by-frame basis is performed. The gray scale characteristics controlled on a frame-by-frame basis are, for example, the number of display gray scale gradations or the resolution of display gray scale gradations.

In the examples of FIGS. 7 through 12, pixels with different brightness are displayed in frames $F_{2j-1}$ and $F_{2j}$ for the same image signal, i.e., for the pixel data of the same value. That is, the brightness of a pixel displayed by the SLM 105a in accordance with the predetermined image signal varies from frame to frame. Also, the setting of display gray scale gradations for the frames above may be switched by the sequencer 131 in accordance with an image signal input 101 or a user setting.

In the above descriptions, various embodiments with respect to a single-panel projection system are described. What follows is a description of an embodiment of a two-panel projection system.

Figure 13:
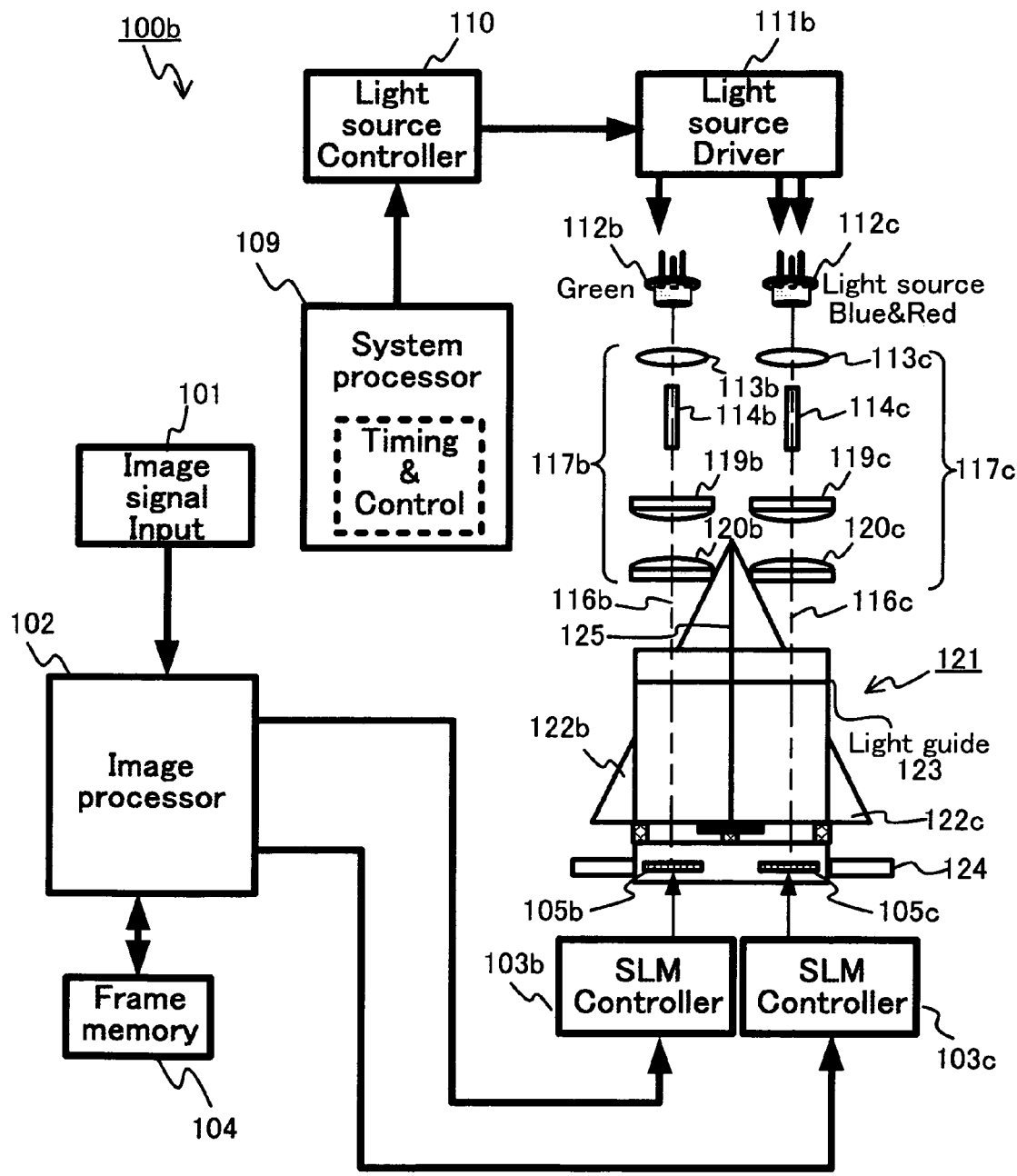
FIG. 13 is a functional block diagram showing the configuration of a two-panel projection system using an adjustable light source according to an embodiment of the present invention.

FIG. 13 is a conceptual diagram showing the configuration of a two-panel projection system using an adjustable light source according to an embodiment of the present invention. A two-panel projection system 100b of FIG. 13 includes an optical system and a control system for the green light and also an optical system and a control system for the blue light and red light.

The projection system 100b is a two-panel projection system including a first SLM 105b and a second SLM 105c projecting an image onto a screen (not shown) in accordance with the externally inputted image signal input 101.

The projection system 100b includes an image processor 102. The image processor 102 receives an image signal input 101 and converts it to data for SLM controller 103b to control SLM 105b and to data for SLM controller 103c to control SLM 105c. SLM controller 103b and SLM 105b are used for the spatial light modulation of green light, and SLM controller 103c and SLM 105c are used for the spatial light modulation of blue light and red light.

The image processor 102 outputs the converted data to SLM controllers 103b and 103c, respectively. Also, a frame memory 104 similar to that shown in FIG. 3 is connected to the image processor 102.

Both SLMs 105b and 105c include minute modulation elements arranged in a two-dimensional array (i.e., in a matrix). An individual modulation element corresponds to each pixel of the image to be displayed. As in FIG. 3, an embodiment in which a DMD is used as SLMs 105b and 105c is described below.

SLMs 105b and 105c are implemented in one device package 124. In FIG. 13, the device package 124 is situated underneath the color synthesis optical system 121.

Figure 14:
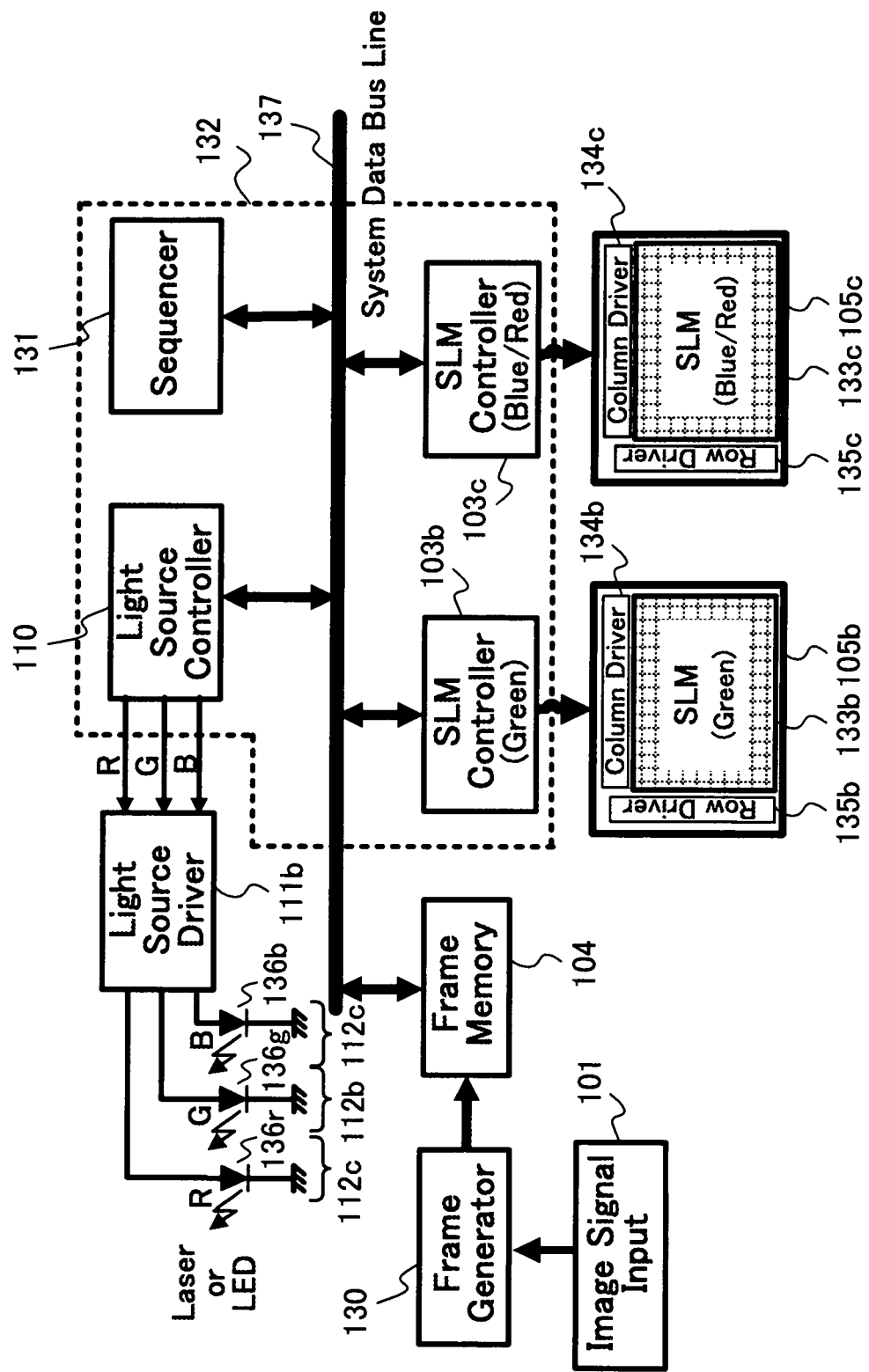
FIG. 14 is a functional block diagram showing the configuration of a two-panel projection system using an adjustable light source according to an embodiment of the present invention.

Light incoming from adjustable light source 112b via the illumination optical system 117b and the color synthesis optical system 121 is incident to SLM 105b. As shown in FIG. 14, adjustable light source 112b includes a green laser light source 136g.

Light incoming from adjustable light source 112c via illumination optical system 117c and the color synthesis optical system 121 is incident to SLM 105c. As shown in FIG. 14, the adjustable light source 112c includes a blue laser light source 136b and a red laser light source 136r.

The color synthesis optical system 121 includes an equilateral triangular prism composed of optical prisms 122b and 122c, right-triangle prisms adhered to one another at the surface 125, and a light guide block 123, a right-triangle prism adhered to the above equilateral triangular prism. In FIG. 13, the color synthesis optical system 121 is shown in a frontal view.

The adhering surface 125 is the lateral face of the right-triangle prism, where the lateral face corresponds to the longer of the two sides composing the right angle of a right triangle.

The surface of the light guide block 123 adhering to the equilateral triangular prism is the lateral face of the right triangular prism that corresponds to the hypotenuse of the right triangle. In FIG. 13, the two lateral faces that correspond to the two sides composing the right angle of the right triangle are depicted as a rectangle.

The first illumination optical system 117b includes a condenser lens 113b, a rod type condenser body 114b, a lens 119b, and a lens 120b, which are arranged in such a way that optical axes thereof coincide with the first illumination light axis 116b, the optical axis of the first illumination optical system 117b. In the same way, the second illumination optical system 117c includes a condenser lens 113c, a rod type condenser body 114c, a lens 119c, and a lens 120c, which are arranged in such a way that the optical axes thereof coincide with the second illumination light axis 116c, the optical axis of the second illumination optical system 117c.

The illumination light axes 116b and 116c are orthogonal to the right triangular prism of the light guide block 123 on the lateral face shown in FIG. 13 as the upper side of the two lateral faces not adhered to the equilateral triangular prism (composed of optical prisms 122b and 122c).

The green light emitted from the adjustable light source 112b is incident to SLM 105b via illumination optical system 117b and the color synthesis optical system 121. The green light reflected by an ON state micromirror of SLM 105b is reflected perpendicularly upwards on the lateral face, which corresponds to the hypotenuse of the right triangle, of the first optical prism 122b. It then passes through the adhering surface 125, is emitted from the lateral face, which corresponds to the hypotenuse of the right triangle, of the second optical prism 122c, is incident to the projection optical system (not shown), and is then projected onto the screen (not shown) along with the projection optical axis of the projection optical system. The green light reflected by an OFF state micromirror of SLM 105b is emitted in a direction different from the projection optical axis of the projection optical system.

The blue light or red light emitted from light source 112c is incident to SLM 105c via illumination optical system 117c and the color synthesis optical system 121. The blue or red light reflected by an ON state micromirror of the second SLM 105c is reflected perpendicularly upwards, reflected on the lateral face, which corresponds to the hypotenuse of the right triangle, of the second optical prism 122c. It is then reflected again on the adhering surface 125, and then incident upon the projection optical system (not shown) along the same optical path as the green light.

The system processor 109 provides the light source controller 110 with information (such as data of a light profile) for controlling the timing of emission and/or the intensity of illumination of the adjustable light sources 112b and 112c, in the same way as in FIG. 3. The light source controller 110 controls the light source driver 111b on the basis of the information designated by the system processor 109. The light source driver 111b respectively drives the adjustable light sources 112b and 112c in accordance with the control performed by the light source controller 110. That is, the adjustable light sources 112b and 112c are indirectly controlled by the system processor 109.

Next, the flow of control and data in the projection system 100b of FIG. 13 is described with reference to FIG. 14. FIG. 14 is a conceptual diagram showing the configuration of a two-panel projection system using an adjustable light source according to an embodiment of the present invention.

In the present embodiment, the image processor 102 of FIG. 13 includes the frame generator 130 of FIG. 14, and an image signal input 101 given from an external device is inputted to the frame generator 130. The frame generator 130 generates the data of an interpolation frame image by using a method, such as a well-known frame interpolation technique.

The frame image data originally included in the image signal input 101 and the frame image data generated by the frame generator 130 are both stored in the frame memory 104.

SLM controllers 103b and 103c and the light source controller 110, which are shown in FIG. 13, may be implemented as one control circuit 132, as shown in FIG. 14.

In the example of FIG. 14, the sequencer 131, which controls the operational timing of SLM controllers 103b and 103c and the light source controller 110, is also implemented on the control circuit 132. Components implemented on the control circuit 132 are connected to each other via a bus 137. The frame memory 104 is also connected to the bus 137.

As the sequencer 131 performs a timing control, the timing of the spatial light modulation by SLMs 105b and 105c, and the emission timing of the adjustable light sources 112b and 112c are thereby controlled. Similar to the process described in FIG. 4, the timing control by the sequencer 131 is sufficient as long as synchronization is attained at the start of a subfield, and it is arbitrary if finer-tuned synchronization is performed in the subfield. Also, the sequencer 131 of FIG. 14 may be implemented as a part of the system processor 109 of FIG. 13.

As described with reference to FIG. 13, SLM controllers 103b and 103c control SLMs 105b and 105c, respectively. SLM 105b includes a micromirror array 133b, a column driver 134b, and a row driver 135b, similar to SLM 105a of FIG. 3. SLM 105c is in a similar configuration.

Also, the adjustable light source 112b shown in FIG. 13 includes a green laser light source 136g, as in FIG. 4. The adjustable light source 112c shown in FIG. 13 includes a blue laser light source 136b and a red laser light source 136r, similar to the ones in FIG. 4. In place of the three laser light source, an LED light source or a light source in which semiconductor light sources and the like are arranged in a sub-array may also be used.

The data of light profiles for the light source driver 111b to drive the red laser light source 136r, the green laser light source 136g, and the blue laser light source 136b is given from the light source controller 110, independently, to the red, green, and blue light sources.

Figure 15:
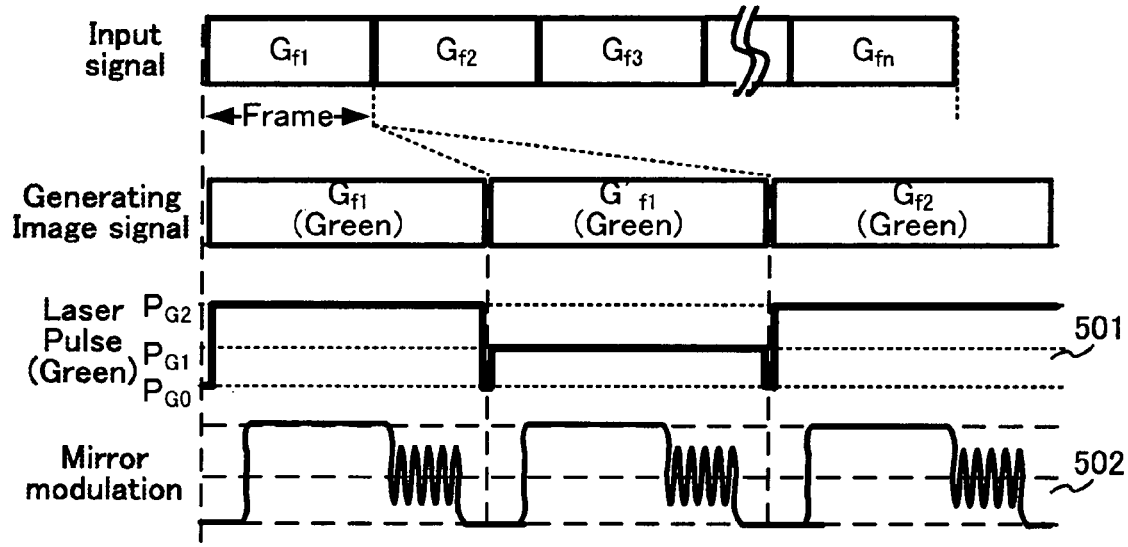
FIG. 15 is a timing chart of a color sequential control in a two-panel projection system using an adjustable light source according to an embodiment of the present invention.
Figure 15:
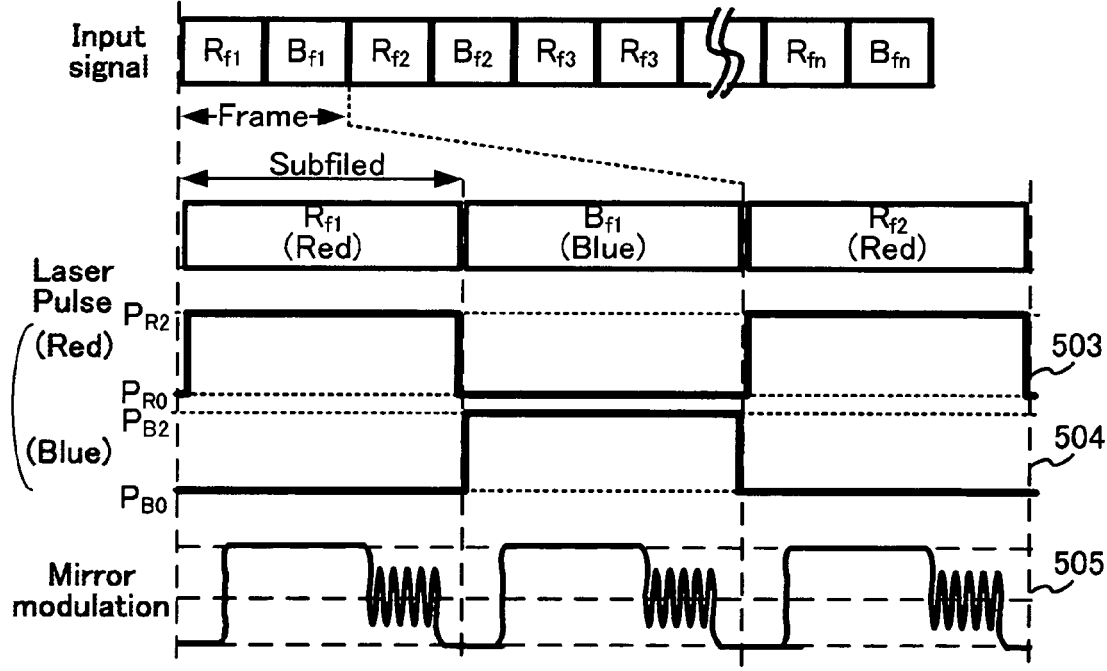

FIG. 15 is a timing chart of a color sequential control in a two-panel projection system using an adjustable light source according to an embodiment of the present invention.

In the example of FIG. 15, a PWM control and an oscillation control are adopted as a method of controlling SLMs 105b and 105c. Specifically, in the example of FIG. 15, SLM controllers 103b and 103c control the length of time in which a micromirror is fixed in an "OFF" state, an "ON" state, and in an oscillating state, in accordance with the values of the gray scale gradations of green, red, and blue that are to be displayed in pixels.

An embodiment is now described in which one frame is divided equally into two subframes, the red and blue subfields. Also, in the projection of green light, one frame is divided into two subframes that may be equal to or different from each other in length.

In the example of FIG. 15, the light intensity of the green laser light source 136g can be set to at least three level: $P_{G0}$, $P_{G1}$, and $P_{G2}$. The light intensity of the blue laser light source 136b can be set to at least two levels: $P_{B0}$ and $P_{B2}$. The light intensity of the red laser light source 136r can also be set to at least two levels: $P_{R0}$ and $P_{R2}$.

Here, as shown in the drawing, the relationships are as follows.

$$P_{G0} < P_{G1} < P_{G2}$$

$$P_{B0} < P_{B1} < P_{B2}$$

$$P_{R0} < P_{R1} < P_{R2}$$

where $P_{G0} = P_{B0} = P_{R0} = 0$. The characteristics of the levels of light intensity are similar to those described with respect to FIG. 7, so a more detailed description is omitted.

The control in the first subfield of the first frame represented as $G_{f1}$ and $R_{f1}$ is performed as described in the following example.

At the start timing of the first subfield given by the sequencer 131 of FIG. 14, the light source controller 110 controls the constant current circuits $I_G$, $I_R$, and $I_B$ of the light source driver 111b so that the light intensity of the green laser light source 136g is set to $P_{G2}$, the light intensity of the red laser light source 136r is set to $P_{R2}$, and the light intensity of the blue laser light source is set to $P_{B2}$. Further, the light source controller 110 controls the switching circuits $SW_G$ and $SW_R$ connected to the respective green laser light source 136g and red laser light source 136r so that they are "ON" and controls the switching circuit $SW_B$ connected to the blue laser light source 136b so that it is "OFF".

Because the blue light source 136b does not perform an emission in the first subfield, a setting of the light intensity of the blue laser light source 136b (i.e., setting of the constant current circuit $I_B$) may be performed, for example, within the first subfield.

In parallel with the above-mentioned control by the light source controller 110, in the first subfield, SLM controller 103g reads out the pixel data representing green from the frame memory 104 for each pixel and controls SLM 105b on the basis of the read out pixel data. Further, SLM controller 103c reads out the pixel data representing red from the frame memory 104 for each pixel, and controls SLM 105c on the basis of the read out pixel data.

In cases of PWM control, by the way, a bit string of the pixel data representing a gray scale gradations of n-bits, for example, can be used as the data for controlling the SLM 105a just as it is. This is because, with respect to each "k" in "1≦k≦n" (where the LSB is referred to as the first bit), the k-th bit in the bit string of pixel data represents the state of a micromirror in the time period corresponding to the k-th bit. Specifically, the value of the k-th bit in the bit string of pixel data represents driving a micromirror to the OFF state when it is "0" and represents driving a micromirror to the ON state when it is "1".

In this case, each bit is not equally weighted in the bit string of pixel data of n-bits that is used as data for controlling the SLM 105a. That is, the intensity of light projected onto the screen due to the fact that a bit value is "1" varies depending on the position of the bit. Specifically, the weight of the k-th bit is $2^{k-1}$ times the weight of the LSB. The kinds of data in which the weight of each bit varies may be referred to as "binary data" hereinafter.

On the other hand, in the control shown in FIG. 15, the bit string of pixel data representing the gray scale gradations of n-bits is, for example, converted by SLM controllers 103b and 103c and used for controlling SLMs 105b and 105c. For the control of SLMs 105b and 105c, a fixed-length bit string composed of three parts may be used, for example.

This fixed-length bit string can be defined according to the embodiment. For example, the first, second, and third parts are composed of more than zero bits in which the value "0" is in sequence, and the boundary between the first and second parts and the boundary between the second and third parts may be represented as a one-bit delimiter of value "1". According to the fixed-length bits in the above-described format, control information designating the following can be expressed:

driving a micromirror to an OFF state for a length of time proportional to the number of bits of the first part;
  driving a micromirror to an ON state for the length of time proportional to the number of bits of the second part; and
  driving a micromirror to an oscillation state for the length of time proportional to the number of bits of the third part.

In the data in the above-described format, the number of bits is significant, but the weights of the bits are equal to each other. Data in which the weight of each bit is equal, regardless of the position of the bits, may be referred to as "non-binary data" hereinafter for convenience. Obviously, the format of a fixed-length bit string, in which the driving state of a micromirror is designated and the weight of each bit is equal, is not limited to the above example.

As mentioned above, a control in the first subfield of the first frame represented as $G_{f1}$ and $R_{f1}$ is performed, and then a control in the second subfield of the first frame represented as $G'_{f1}$ and $B_{f1}$ is performed as described in the example below.

At the start timing of the second subfield given by the sequencer 131 of FIG. 14, the light source controller 110 controls the light source driver 111b to set the light intensity of the green laser light source 136g to $P_{G1}$. The light intensities of the red laser light source 136r and the blue laser light source 136b do not have to be set again since they have been set to $P_{R2}$ and $P_{B2}$ in advance.

In parallel with the start timing of the second subfield, SLM controller 103b controls SLM 105b based on the pixel data representing green, read out at a first subfield. Further, SLM controller 103c reads out the pixel data representing blue from the frame memory 104 for each pixel, and controls SLM 105c based on the read out pixel data.

In the frames following the second frame, a control similar to that performed in the first frame is repeated. That is, in the example of FIG. 15, a control changing the intensity of illumination light on a subfield-by-subfield basis is performed, at least with respect to light of one specific color, i.e., green light. Of course, it is possible to modify the embodiment of FIG. 15 to change the intensity of illumination light from the adjustable light source 112b on a frame-by-frame basis, as well as to change the intensity of illumination light of at least the green laser light source 136g for each subfield in one frame.

According to the example of FIG. 15, in the two-panel projection system 100b, the resolution of green light can be increased to be higher than the resolution of red and blue light. Specifically, the number of gray scale gradations of green light can be increased. This is because the intensity of illumination light of the green laser light source 136g per unit time varies between the two subfields $G_{f1}$ and $G'_{f1}$. A viewer perceives the brightness of a fine intermediate gradation that cannot be expressed in one subfield as an average of two subfields. Therefore, according to the example of FIG. 15, a smoother image display can be achieved.

Specific processes of conversion for converting a bit string of pixel data representing green into respective pieces of non-binary data for respective subfields $G_{f1}$ and $G'_{f1}$ are adjusted depending on the required resolution of green light, the ratio of the light intensity between $P_{G2}$ and $P_{G1}$, the ratio of the length of subfields between $G_{f1}$ and $G'_{f1}$, the ratio of the reflectance of light between the ON state and the oscillation state, or the like. Preferably, a specific process of conversion appropriate for the embodiment is performed.

Having described a number of embodiments in detail above, the present invention is not limited to the above-exemplified embodiments and may be embodied with various modifications made therein without departing from the spirit of the invention.

The control method of a micromirror of the DMD may be flexibly selected from a PWM control, an oscillation control, or other control methods, regardless of whether the projection system is single-panel or multi-panel.

A PWM control using the pixel data itself as binary data may be performed, but a PWM control based on non-binary data is also possible. For example, in the mirror modulation control waveform 502 in FIG. 15, the periods in which a micromirror is controlled to the OFF state and ON state in one subfield are periods of a PWM control mode. That is, FIG. 15 also exemplifies a PWM control using non-binary data.

In order for the SLM controller 103a to control the length of the time periods of the OFF state and the ON state in one subfield by using non-binary data, the example of FIG. 7 may be modified. In those cases, there may be a single time period in an OFF state and a single time period in an ON state in one subfield, or a number of time periods in an ON state may be dispersed in one subfield. The SLM controller 103a can convert pixel data into non-binary data in a format, depending on the pattern of the OFF state and the ON state, and use the non-binary data to control the SLM 105a.

As long as they do not contradict each other, a number of control processes shown in different embodiments may be combined. For example, the intensity of illumination light of the adjustable light source may be changed on a frame-by-frame basis by combining the above mentioned several embodiments in order to change both the light intensity and the pulse width of the laser light source in each frame. Specifically, an embodiment can adjust the dynamic ranges on a frame-by-frame basis by using a laser light source that performs a pulse emission and by changing, on a frame-by-frame basis, at least two of the following operational characteristics including the peak values of the emission pulses (i.e., the light intensity of the laser light source), the pulse widths of the emission pulses, the emission frequency of the emission pulses, and the number of the emission pulses.

Also, in the two-panel projection system, instead of changing the light intensity of the laser light sources, the intensity of illumination light of the adjustable light source may be changed frame-by-frame by changing either the pulse width, emission frequency, the number of emissions, or emission interval. As in a single-panel projection system, in the two-panel projection system, a control for changing the dynamic range of brightness of at least one color (i.e., the gray scale characteristic) on a frame-by-frame basis may be implemented in various ways.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. An image display apparatus, comprising:
   a light source for emitting an illumination light;
      at least one spatial light modulator for receiving and applying an image signal for modulating the illumination light emitted from the light source; and
      a control circuit for controlling the light source or the spatial light modulator to project a modulated light for image display having different gray scale characteristics between at least two successive frames; and
      wherein at least one of the successive frames is a frame generated by interpolating images of other frames among said successive frames.

2. The image display apparatus according to claim 1, wherein:
   the control circuit controls the light source or the spatial light modulator to project the modulated light for image display having different number of display gray scale gradations in at least one of the frames.

3. The image display apparatus according to claim 1, wherein:
   the control circuit controls the light source or the spatial light modulator to project the modulated light for image display having different resolutions of a display gray scale gradations in at least one of the frames.

4. The image display apparatus according to claim 1, wherein:
   the control circuit controls the light source or the spatial light modulator to project the modulated light for image display having different dynamic ranges of a brightness in at least one of the frames.

5. The image display apparatus according to claim 1, wherein:
   the spatial light modulator modulating the illumination light in accordance with a predetermined image signal to generate the modulate light having a different brightness in at least one of the display frames from another brightness in another one of the frames.

6. The image display apparatus according to claim 1, wherein:
   the control circuit controls the light source and the spatial light modulator to operate in a display period of at least one of the frames having a different period length from another one of the frames.

7. The image display apparatus according to claim 1, wherein:
the control circuit controls the light source to adjust an intensity of the illumination light emitted from the light source in a display period of at least one of the frames.

8. The image display apparatus according to claim 1, wherein:
the spatial light modulator comprises a mirror device including a plurality of deflectable mirror elements arranged as mirror array for deflecting the illumination light according to the image signal to a plurality of directions.

9. The image display apparatus according to claim 8, further comprising:
a projection optical system for projecting a light beam modulated by the spatial light modulator, wherein the mirror elements are controlled in accordance with the image signal to operate in an ON state for deflecting the illumination light to the projection optical system, an OFF state for deflecting the illumination light away from the projection optical system, or an oscillation state for oscillating between the ON state and the OFF state.

10. The image display apparatus according to claim 1, wherein:
the control circuit further converts the image signal corresponding to pixels of the spatial light modulator into non-binary data, and applies the non-binary data to control the spatial light modulator and/or the light source.

11. An image display apparatus, comprising:
a light source for emitting an illumination light;
at least one spatial light modulator for receiving and applying an image signal for modulating the illumination light emitted from the light source; and
a control circuit for controlling the light source and/or the spatial light modulator to project a modulated light for image display having different gray scale characteristics between at least two successive frames by interpolating images of other frames among said at least two successive frames.

* * * * *